United States Patent
Aruga et al.

(10) Patent No.: US 8,488,184 B2
(45) Date of Patent: Jul. 16, 2013

(54) IMAGE FORMING APPARATUS HAVING A PLURALITY OF INDIVIDUALLY CONTROLLED RECORDING HEADS

(75) Inventors: Toshinao Aruga, Akiruno (JP); Keiichirou Tawara, Hachioji (JP); Naoki Ishii, Inagi (JP)

(73) Assignee: Riso Kagaku Corporation, Tokyo (JP)

( * ) Notice: Subject to any disclaimer, the term of this patent is extended or adjusted under 35 U.S.C. 154(b) by 1399 days.

(21) Appl. No.: 11/081,352

(22) Filed: Mar. 15, 2005

(65) Prior Publication Data
US 2005/0206921 A1   Sep. 22, 2005

(30) Foreign Application Priority Data

Mar. 18, 2004  (JP) ................................ 2004-078744
Mar. 24, 2004  (JP) ................................ 2004-087734

(51) Int. Cl.
*G06K 15/22* (2006.01)
(52) U.S. Cl.
USPC ............. 358/1.4; 358/1.8; 358/421; 358/448; 347/10; 347/12; 347/13; 347/14; 347/17; 347/19; 347/74; 347/78; 347/79; 347/80; 347/81
(58) Field of Classification Search
USPC .............. 358/421, 1.8, 448; 347/3–19, 74–81
See application file for complete search history.

(56) References Cited

U.S. PATENT DOCUMENTS

| | | | | |
|---|---|---|---|---|
| 6,072,596 A | * | 6/2000 | Hattori et al. | 358/401 |
| 6,154,621 A | * | 11/2000 | Yamamoto et al. | 399/68 |
| 6,328,394 B1 | * | 12/2001 | Shirai et al. | 347/2 |
| 6,471,315 B1 | * | 10/2002 | Kurata | 347/8 |
| 6,568,776 B1 | * | 5/2003 | Kato | 347/8 |
| 6,725,770 B2 | * | 4/2004 | Maeda | 101/129 |
| 6,804,033 B1 | * | 10/2004 | Hara | 358/522 |
| 2001/0010534 A1 | * | 8/2001 | Kushida et al. | 347/173 |
| 2002/0021319 A1 | * | 2/2002 | Kawatoko et al. | 347/15 |
| 2002/0030709 A1 | * | 3/2002 | Iwasaki et al. | 347/19 |
| 2002/0036667 A1 | * | 3/2002 | Shingyohuchi | 347/11 |
| 2002/0044170 A1 | * | 4/2002 | Takahashi et al. | 347/40 |

(Continued)

FOREIGN PATENT DOCUMENTS

JP   02-311086 A   12/1990
JP   03-003840 A   1/1991

(Continued)

OTHER PUBLICATIONS

Japanese Office Action dated Feb. 10, 2009 (2 pages), and English translation thereof (2 pages) issued in counterpart Japanese Application No. 2004-087734.

(Continued)

*Primary Examiner* — Benjamin O Dulaney
(74) *Attorney, Agent, or Firm* — Holtz, Holtz, Goodman & Chick, PC

(57) ABSTRACT

According to the present invention, there is disclosed an image forming apparatus comprising a constitution driven/controlled independently for each recording head. The apparatus rewrites image data or parameters or changes a driving voltage at a desired timing, and realizes a uniform or appropriate density of an image formed by control of an ink spout amount based on a temperature detection signal of the recording head detected by a temperature detection unit disposed in each recording head. The apparatus is capable of remarkably narrowing a mutual conveying interval among a plurality of conveyed recording mediums.

7 Claims, 14 Drawing Sheets

U.S. PATENT DOCUMENTS

| | | | |
|---|---|---|---|
| 2002/0081120 A1* | 6/2002 | Oberhoffner | 399/2 |
| 2002/0171708 A1* | 11/2002 | Watanabe et al. | 347/40 |
| 2003/0011650 A1* | 1/2003 | Asakawa | 347/8 |
| 2003/0016263 A1* | 1/2003 | Takahashi et al. | 347/19 |
| 2003/0103101 A1* | 6/2003 | Otsuki | 347/41 |
| 2003/0179255 A1* | 9/2003 | Mizutani et al. | 347/14 |
| 2004/0046814 A1* | 3/2004 | Canti et al. | 347/14 |
| 2004/0070637 A1* | 4/2004 | Kanematsu et al. | 347/12 |
| 2004/0169692 A1* | 9/2004 | Sugaya et al. | 347/14 |
| 2004/0196319 A1* | 10/2004 | Aruga | 347/9 |
| 2005/0185023 A1* | 8/2005 | Furukawa et al. | 347/61 |
| 2007/0165058 A1* | 7/2007 | Tamura et al. | 347/17 |
| 2007/0291060 A1* | 12/2007 | Aruga | 347/12 |

FOREIGN PATENT DOCUMENTS

| | | |
|---|---|---|
| JP | 10-039570 A | 2/1998 |
| JP | 11-170623 A | 6/1999 |
| JP | 2001-010178 A | 1/2001 |
| JP | 2002-067445 A | 3/2002 |
| JP | 2003-001879 A | 1/2003 |
| JP | 2003-034020 A | 2/2003 |

OTHER PUBLICATIONS

Japanese Office Action (and English translation thereof) dated Nov. 25, 2008, issued in a counterpart Japanese Application.

* cited by examiner

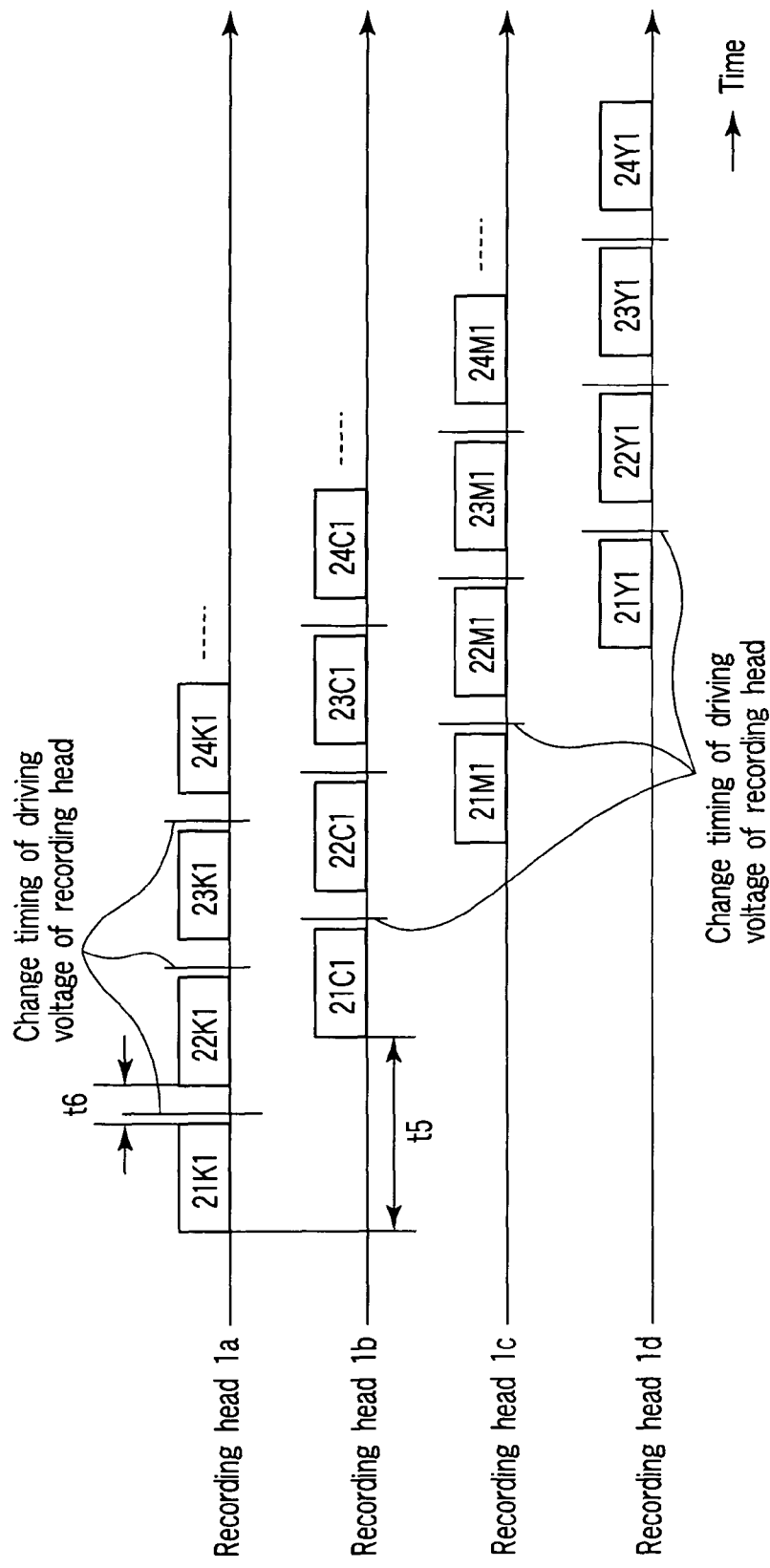
F I G. 9

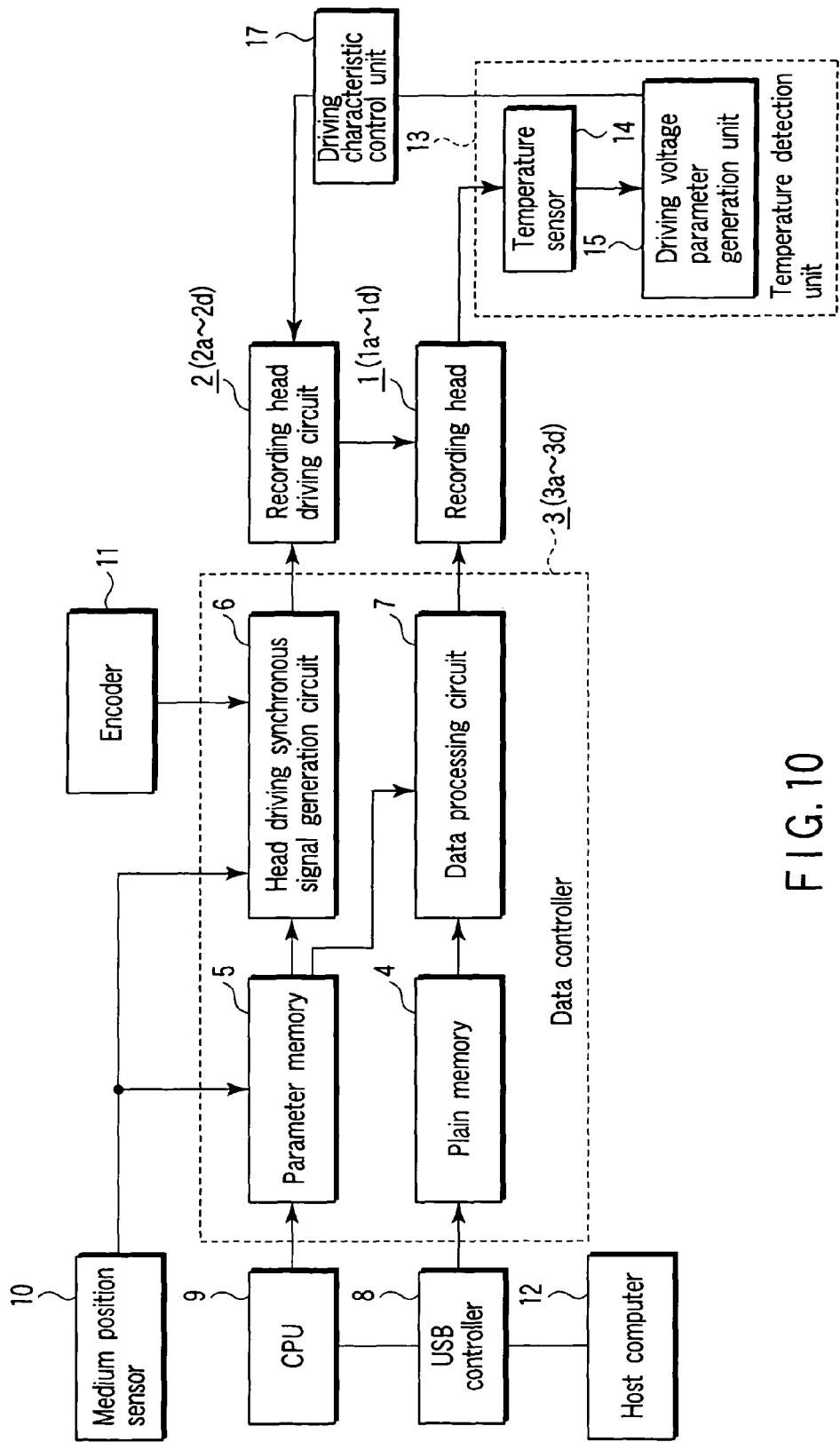
F I G. 10

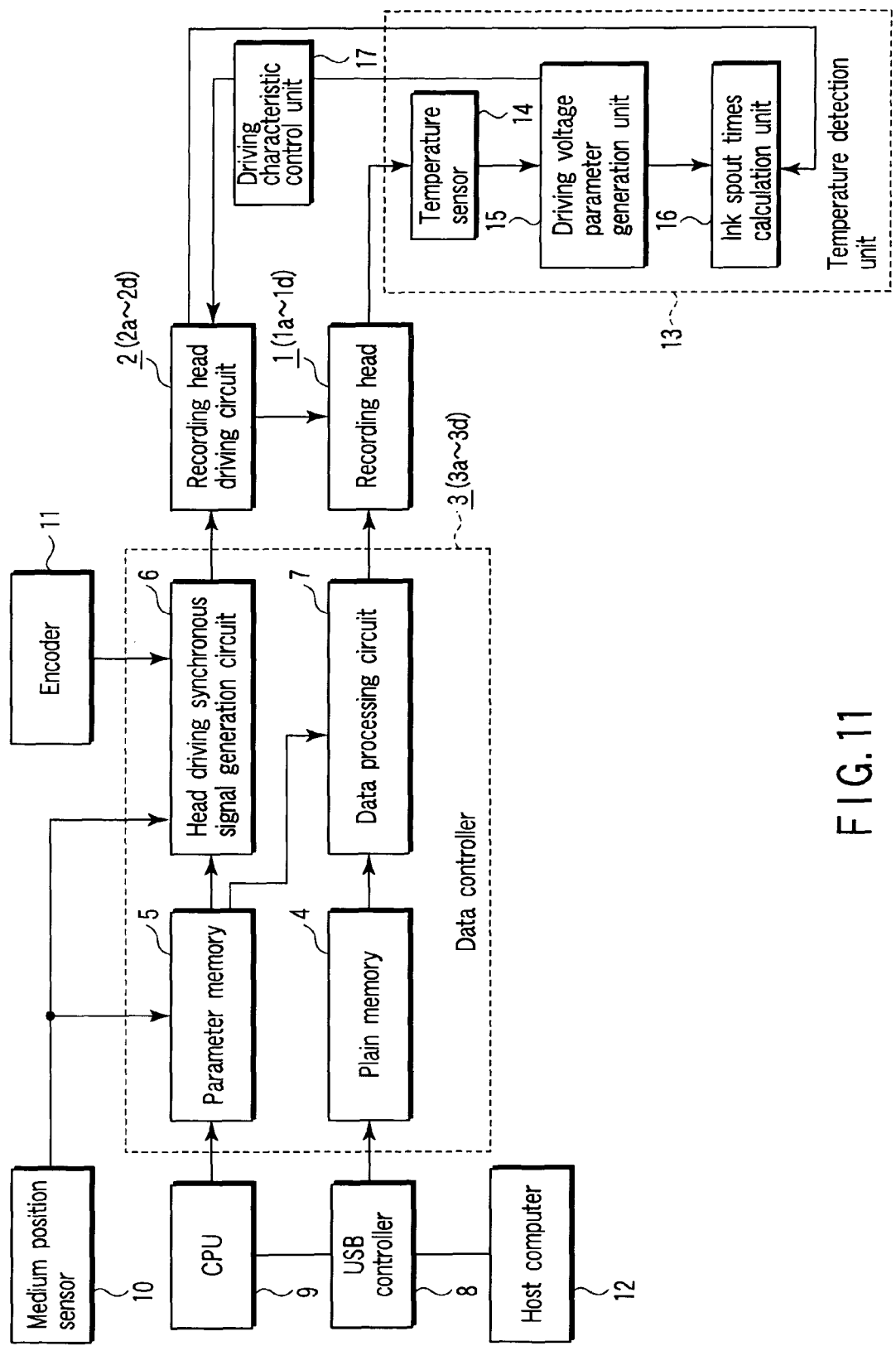
F I G. 11

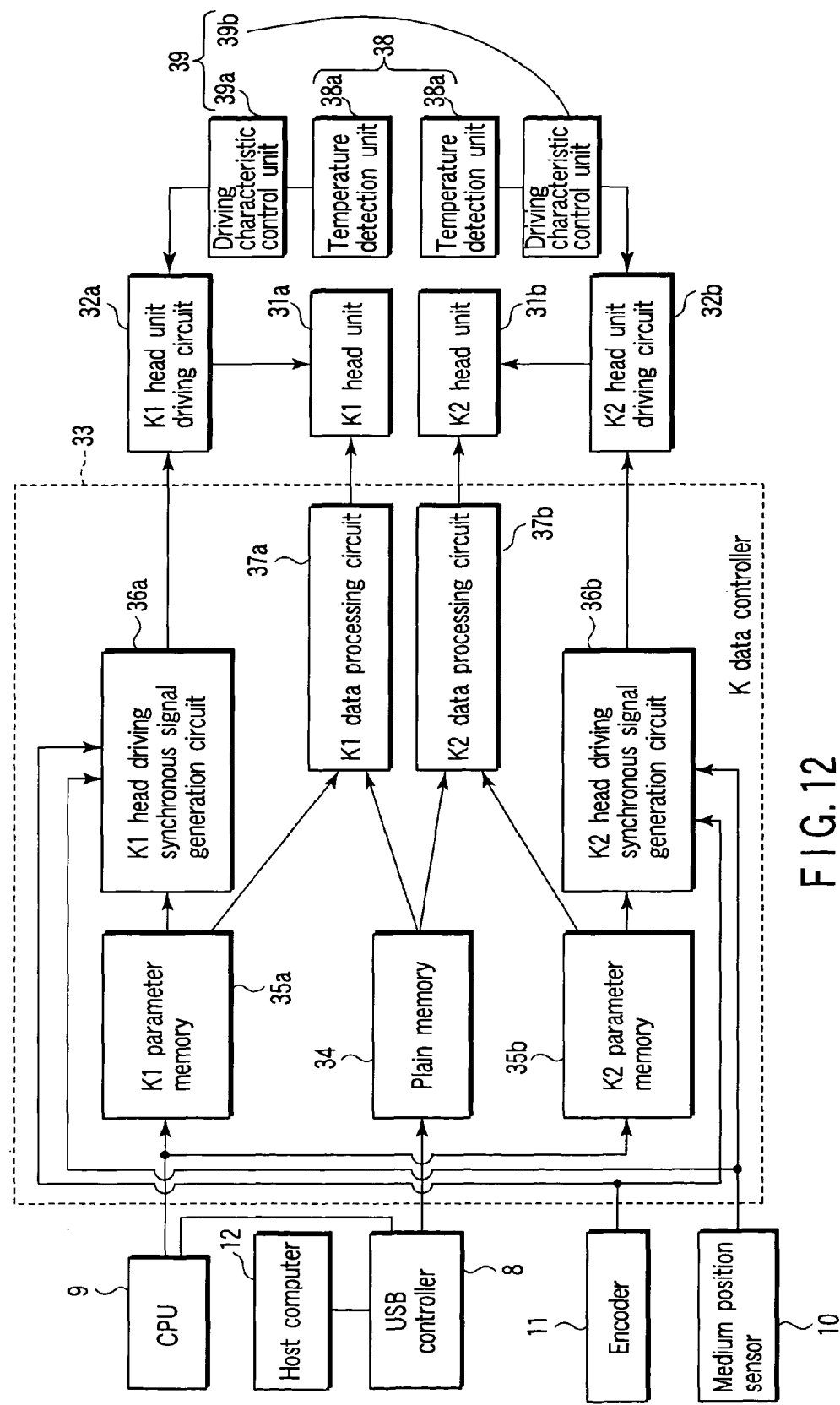
F I G. 12

IMAGE FORMING APPARATUS HAVING A PLURALITY OF INDIVIDUALLY CONTROLLED RECORDING HEADS

CROSS-REFERENCE TO RELATED APPLICATIONS

This application is based upon and claims the benefit of priority from prior Japanese Patent Applications No. 2004-078744, filed Mar. 18, 2004; and No. 2004-087734, filed Mar. 24, 2004, the entire contents of both of which are incorporated herein by reference.

BACKGROUND OF THE INVENTION

1. Field of the Invention

The present invention relates to an image forming apparatus which forms an image on a recording medium by an ink jet system.

2. Description of the Related Art

In general, in an image forming apparatus of an ink jet system, a plurality of recording heads are arranged at an equal interval, and ink is spouted (eject) to a recording medium, for example, an image forms to a recording sheet by ink spouts. For example, to form a color image, at least four colors of ink are used [black, cyan, magenta, and yellow].

FIG. 14 is a diagram showing a schematic constitution example by four recording heads and a medium conveying mechanism, for forming the color image in a conventional image forming apparatus. FIG. 15 is a diagram showing an image forming timing of image data in each recording head.

In the image forming apparatus, fixed recording heads for discharging four colors of ink are arranged at an equal interval in order of black (K), cyan (C), magenta (M), and yellow (Y) from an upstream side on an upper side of a conveying path of a recording medium in the medium conveying mechanism. That is, each recording head is offset, disposed, and driven/controlled by one data controller. A transmission type inlet TOF sensor (medium sensor) 61 for detecting the recording medium is disposed on the upstream side of the recording head K. A transmission type outlet TOF sensor 62 is similarly disposed on a downstream side of the recording head Y. Front/rear end portions of a recording medium 63 (63a, 63b) conveyed on the conveying path of the medium conveying mechanism are detected by these sensors 61, 62.

In this constitution, when the image is formed on the recording medium 63, the recording medium 63a, for example, recording sheets are taken out of a recording medium cassette (not shown) sheet by sheet, and conveyed to a recording position in a conveying direction X at a constant speed by the medium conveying mechanism. At this time, as described later, each color image data is distributed to each color and input into the respective recording heads K, C, M and Y from a data controller.

Moreover, when a tip of the recording medium 63a is detected by the inlet TOF sensor 61 shown in FIG. 14, different colors of ink are successively spouted to thereby form an image at a predetermined timing by the respective recording heads K, C, M and Y. The recording medium 63a on which the image has been formed is conveyed as such, a rear end of the recording medium is detected by the outlet TOF sensor 62, and thereafter the medium is spouted out of the apparatus, and stored in a containing cassette (not shown) or the like.

The color image data in this constitution is input into the controller shown in FIG. 14 from a host apparatus (not shown) during the image formation.

In the data controller, the color image data is divided into color image data for the respective colors, and transferred to the corresponding recording heads K, C, M and Y respectively. Moreover, the data controller is synchronized with the recording medium 63 conveyed in a Y-direction, the color image data is successively formed into the image on the recording medium 63 by the respective recording heads K, C, M and Y, and the color image data for one page is formed into the image.

The respective recording heads K, C, M and Y are arranged at an interval corresponding to an offset amount L in the Y-direction.

FIG. 15 shows the recording of the color image data transferred to each recording head, and a relation with an image forming time in an image data portion in each recording head.

A time t11 in FIG. 15 is a time obtained by dividing an offset amount L1, between the first recording head K and the last recording head Y in a conveying direction by a movement speed of the recording medium. A time t12 shows a time obtained by dividing an interval L2 between the rear end of the preceding conveyed recording medium and a tip of the following conveyed recording medium by the movement speed of the recording medium. It is assumed that the movement speed of the recording medium is constant. Therefore, lengths of the times t11 and t12 relatively suggest distances.

It is indicated in FIG. 15 that white data corresponding to the interval of the offset amount L shown in FIG. 14 is added to each color image data.

This white data indicates that the recording head does not actually spout any ink.

Moreover, in FIG. 15, color image data 1K, 1C, 1M, 1Y for one page transferred by the data controller, and color image data 2K, 2C, 2M, 2Y for two pages are shown with respect to each of the recording heads K, C, M and Y arranged at the interval of the offset amount L shown in FIG. 14.

When the data controller transfers the color image data for one page to the respective recording heads K, C, M and Y each white data corresponding to the offset amount L in the arrangement interval of the recording heads K, C, M and Y is added to the color image data for one page, and accordingly the color image can be formed on the recording medium 63 without any color shift.

Moreover, after ending the forming of the image by the recording head Y in a most downstream, the color image data of the next page (second page) is transferred to the respective colors of the recording heads K, C, M and Y, and each color image is successively formed with respect to the next conveyed recording medium.

Additionally, each of the above-described recording heads K, C, M and Y comprises one recording head extending along a transverse-width direction X of the recording medium 63.

On the other hand, for example, one recording head K is sometimes constituted by connecting a plurality of head units K1, K2, . . . as shown in FIG. 16. These recording head units K1, K2 are arranged, for example, in two rows (K1 and K2 rows) in such a manner that any gap is not made in the conveying direction Y of the recording medium 63 at an image forming time, and the units are alternately arranged in such a manner that an end portion of a nozzle row 71 of each head unit is slightly superimposed on another end portion.

Even in this recording head, the color image can be similarly formed without any color shift in consideration of an offset amount L3 between the head units (nozzle rows) and an offset amount (distance between the recording mediums) L4 between the recording mediums, and accordingly a color image can be formed without any color shift.

In the above-described conventional image forming apparatus shown in FIGS. 15, 16, after ending the image forming by a detection signal of the outlet TOF sensor 62, that is, the last recording head Y, by the control of the driving of one data controller, the transfer of the color image data including the white data is restarted with respect to all the recording heads K, C, M and Y, and the image is formed from the image data of K.

That is, the color image of each color is formed by the recording heads K, C, M and Y. Therefore, after ending the spout of the ink by the recording head Y of the most downstream, the color image data of the next page is transferred to each recording head to thereby form the image.

Therefore, the number of recording mediums on which the image can be formed once is limited to one sheet.

That is, the medium conveying interval of the recording medium 63 is influenced by the interval between the recording heads in the medium conveying direction, and the interval between the nozzle rows. When the interval between the recording mediums cannot be easily reduced, the number of sheets subjected to the image forming per unit time, that is, throughput does not rise.

In a case where there is an offset amount (distance between the nozzle rows of the recording heads K, Y) L1 of the recording head, a distance (medium conveying interval) L2 between the preceding conveyed recording medium 63 and the following conveyed recording medium 63 has to be set to be larger than the offset amount L1, that is, L2>L1 (t12>t11) as shown. Accordingly, as to a time interval between the preceding conveyed recording medium 63 and the following conveyed recording medium 63, at least a time t11+time for forming the image by the recording head Y is required, even if a time required for forming the image is short.

Moreover, in the recording head in which two rows of head units K1, K2 are arranged alternately forwards/backwards in the conveying direction as shown in FIG. 16, an offset amount (interval between the nozzle rows) L3 between the head unit K1, K2 rows has to be considered in order to reduce the image forming time. When the offset amount L3 is assumed, an interval (medium conveying interval) L4 between the preceding conveyed recording medium 63a and the following conveyed recording medium 63b is set to be larger than the offset amount L3 between the nozzle rows as shown, that is, L4>L3. That is, after ending the spout of the ink by the head unit K2 row, each recording head unit cannot accept the image data of the next page, and the image cannot be formed. Therefore, when there is a relation L4>L3, a first (first page) image is formed on the previous recording medium 63a, and thereafter the second (second page) image data can be formed with respect to the subsequent recording medium 63b.

Moreover, in general, as to the recording head, even when the head temperature changes by an elapsed driving time, and the recording head is driven with an equal driving voltage, an amount of spouted ink differs, and therefore the density (color depth) of the formed image differs. Therefore, a driving characteristic, that is, driving voltage is adjusted in accordance with the temperature of the recording head. In general, when the temperature of the recording head rises, the ink spout amount increases, and the concentration of the image increases. Conversely, when the temperature drops, the density of the image tends to decrease.

With regard to a timing to adjust the driving voltage, as shown in FIG. 16, in an apparatus which ends the forming of the image on the first (first page) recording medium 63a, and thereafter forms the image on the next second (second page) recording medium 63b, the driving voltage of the recording head is adjusted for each image data.

Moreover, since the image data formed into the image by each recording head differs in a constitution capable of individually driving the recording heads, the density of the image cannot be adjusted while controlling the driving voltage all at once. In an example of FIG. 17, the density can be adjusted after forming a yellow image by the recording head Y disposed on a most downstream side.

BRIEF SUMMARY OF THE INVENTION

A first aspect of the present invention is directed to an image forming apparatus comprising a plurality of recording heads disposed for respective each color of an image formed on a conveyed recording medium with an offset in a medium conveying direction; recording head driving units which are disposed in the respective recording heads and which drive the recording heads to form the image on the recording medium; a medium position detection unit which detects position information of the conveyed recording medium; and a data control unit which is disposed for each recording head and which applies to image data a parameter inherent in each recording head and concerning predetermined image formation and which determines an image formation delay time associated with the offset in response to the parameter and a detection signal from the medium position detection unit and which delays and drives the recording head driving unit based on the image formation delay time.

A second aspect of the present invention is directed to an image forming apparatus comprising a recording head comprising a plurality of head units which form divided images in divided regions obtained by dividing an image forming region of a conveyed recording medium to prepare one image and which are disposed with an offset in a medium conveying direction; recording head driving units which are disposed in the respective head units and which drive the head units to form the divided images on the recording medium; a medium position detection unit which detects position information of the conveyed recording medium; and a data control unit which is disposed for each head unit and which applies to image data a parameter inherent in each head unit and concerning predetermined image formation and which determines an image formation delay time associated with the offset in accordance with the parameter and a detection signal from the medium position detection unit and which delays and drives the head unit driving unit based on the image formation delay time.

A third aspect of the present invention is directed to an image forming apparatus comprising a conveying mechanism which conveys a plurality of recording mediums at a predetermined interval; a plurality of recording heads in which recording element rows are arranged in such a manner as to extend in a direction crossing a conveying direction of the recording medium at right angles and which are arranged at an interval along the conveying direction; a data control unit which generates input image data for each recording element row of the plurality of recording heads; recording head driving units which drives the recording heads at predetermined timings; a medium position detection unit which detects presence of the recording medium conveyed by the conveying mechanism; and a driving characteristic control unit which controls a driving characteristic of the recording head. The data control unit calculates a medium gap between a preceding conveyed recording medium and a following conveyed recording medium from a detection result of the position sensor, selects the recording head in which the recording region of the recording element row faces the medium gap from the plurality of recording heads, and changes the driving characteristic of the recording head while the recording region of the recording element row of the recording head faces the medium gap.

A fourth aspect of the present invention is directed to an image forming apparatus comprising a conveying mechanism which conveys a plurality of recording mediums at a predetermined interval; a recording head comprising a plurality of head units which are arranged with an offset in a medium conveying direction of the conveyed recording medium and which form divided images in divided regions obtained by dividing an image forming region to prepare one image; a data control unit which prepares input image data for each of the plurality of head units; a driving circuit which drives the recording heads at predetermined timings; a medium position detection unit which detects presence of the recording medium conveyed by the conveying mechanism; and a driving characteristic control unit which controls a driving characteristic of the recording head. The data control unit calculates a medium gap between a preceding conveyed recording medium and a following conveyed recording medium from a detection result of the medium position detection unit, selects the recording head in which the recording region of the recording element row faces the medium gap from the plurality of recording heads, and changes the driving characteristic of the recording head by the control of the driving characteristic control unit while the recording region of the recording element row of the recording head faces the medium gap.

BRIEF DESCRIPTION OF THE SEVERAL VIEWS OF THE DRAWING

FIG. 5 is a timing chart of the data transfer and image formation, showing the image formation in the second embodiment;

FIG. 9 is a timing chart of image formation, showing the image formation in the fourth embodiment;

FIG. 10 is a diagram showing a first modification of a temperature detection unit in the fourth embodiment;

FIG. 11 is a diagram showing a second modification of the temperature detection unit in the fourth embodiment;

FIG. 12 is a diagram showing a constitution example of an image forming apparatus according to a fifth embodiment;

FIG. 17 is an explanatory view of a timing to change a driving voltage of a recording head in an image forming apparatus capable of individually driving the recording head.

DETAILED DESCRIPTION OF THE INVENTION

Embodiments of the present invention will be described hereinafter in detail with reference to the drawings.

Figure 1:
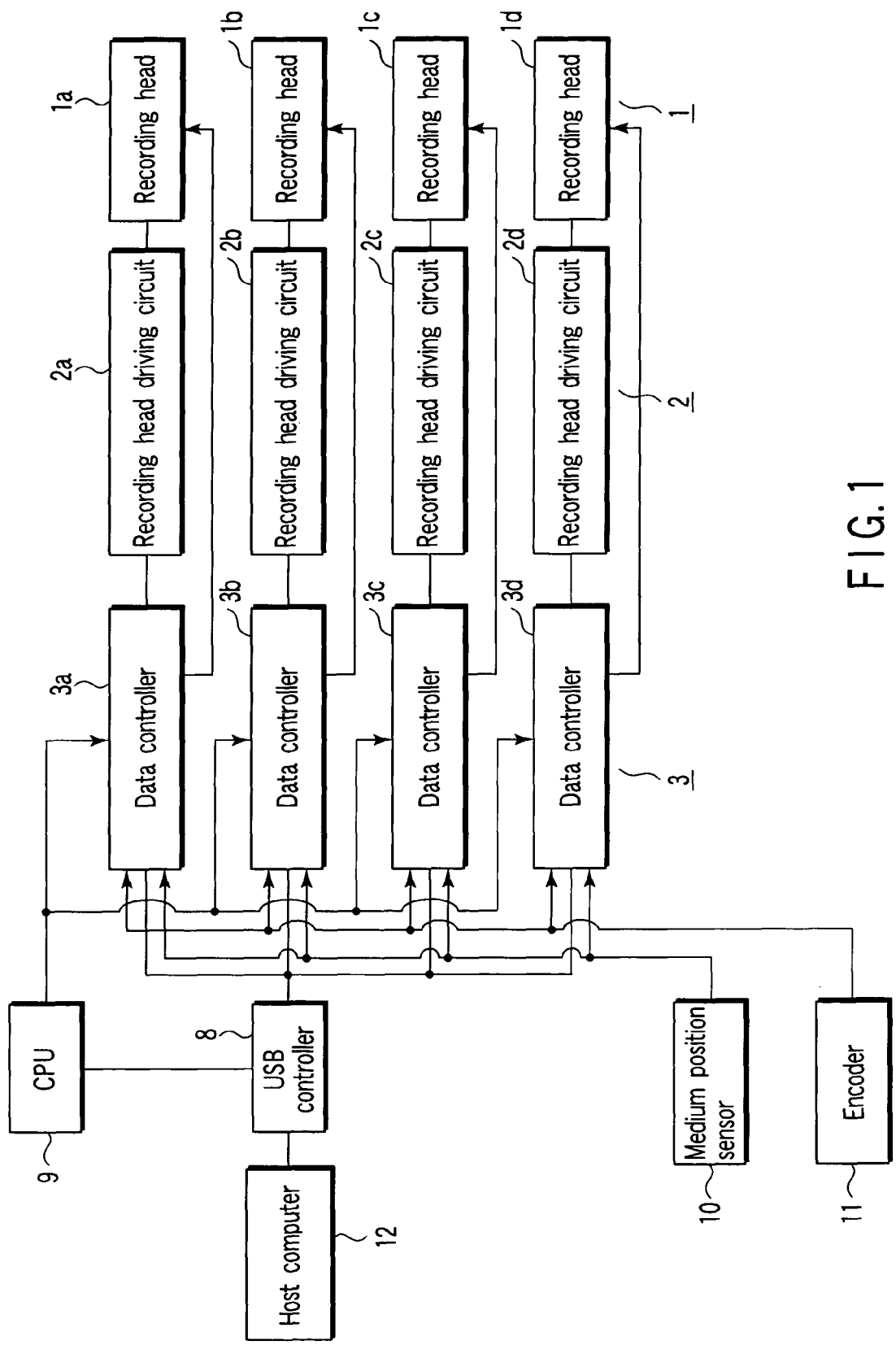
FIG. 1 is a diagram showing a constitution example of an image forming apparatus according to a first embodiment of the present invention.

FIG. 1 shows a constitution example of an image forming apparatus according to a first embodiment of the present invention.

This image forming apparatus of an ink jet system comprises at least four sets of recording heads 1 (1a to 1d), and forms a color image using four different colors of ink [e.g., black (K), cyan (C), magenta (M), and yellow (Y)]. In the present embodiment, the recording heads are arranged to spout colors of ink in such a manner that a recording head 1a spouts black K, the recording head 1b spouts cyan C, the recording head 1c spouts magenta M, and the recording head 1d spouts yellow Y toward a downstream side from an upstream side of a conveying mechanism of a recording medium.

In the constitution example shown in FIG. 1 in the present embodiment, the recording heads 1a to 1d have nozzle rows (not shown) in which a plurality of nozzles are arranged in one row with a length exceeding a transverse width of the recording medium.

These recording heads 1a to 1d are driven by recording head driving circuits 2 (2a to 2d), and spout ink to the conveyed recording medium (not shown) to form an image. These recording heads 1 and recording head driving circuits 2 are driven/controlled by data controllers 3 (3a to 3d).

In the present embodiment, at least one data controller 3 is disposed for each recording head 1. That is, in a constitution comprising four sets of recording heads 1a to 1d, at least four data controllers 3a to 3d are disposed, and constituted to be capable of setting image forming timings and parameters.

Figure 2:
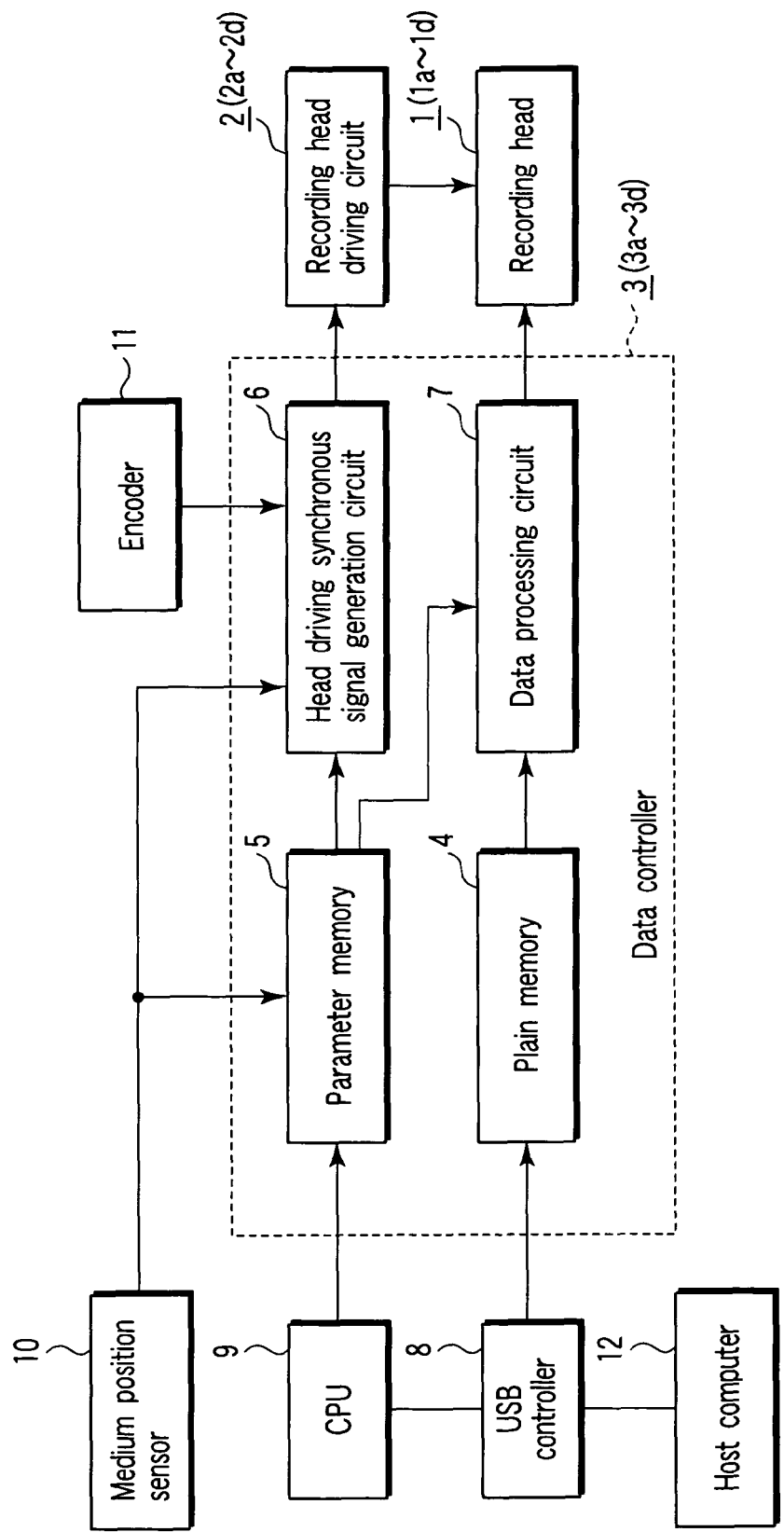
FIG. 2 is a diagram showing a constitution example of a data controller in the first embodiment.

As shown in FIG. 2, these data controllers 3a to 3d comprise a plain memory 4, a parameter memory 5, a head driving synchronous signal generation circuit 6, and a data processing circuit 7. The plain memory 4 is capable of storing a plurality of image data. The parameter memory 5 stores parameters for appropriately driving the recording heads 1a to 1d. The head driving synchronous signal generation circuit 6 generates a driving synchronous signal, and sends the signal to the recording head driving circuits 2a to 2d. The data processing circuit 7 reads the image data based on an area (or an address indicating a range) designated from the plain memory 4, and transfers the data to the recording heads 1a to 1d.

The parameters are information inherent in the recording heads and concerning the image formation. Concretely, the parameters are constituted of start end and terminal end information of the image data, address indicating a formed image data region, address (nozzle number) of the nozzle of each of the recording heads 1a to 1d to be driven, timing correction information for driving each nozzle and the like. The parameters of the image forming information may include correction parameters for correcting fluctuations in manufacturing the recording heads 1a to 1d.

Furthermore, each of the data controllers 3a to 3d is provided with a USB controller 8, a CPU 9, a medium position sensor 10, and an encoder 11. A sensor which detects the discharging of the recording medium on which the image is formed may be disposed. Among these components, the USB controller 8 functions as an interface for inputting the data of the image to be formed into the plain memory 4 from an image memory 12. The CPU 9 sets the parameters. The medium position sensor 10 is disposed on the upstream side from the recording head 1a in a recording medium conveying path to detect front/rear ends of a recording medium. The encoder 11 is attached to a conveying mechanism, and generates a reference signal in a movement amount of the recording medium.

Next, image formation in the first embodiment will be described with reference to a timing chart of the image formation shown in FIG. 3.

Figure 3:
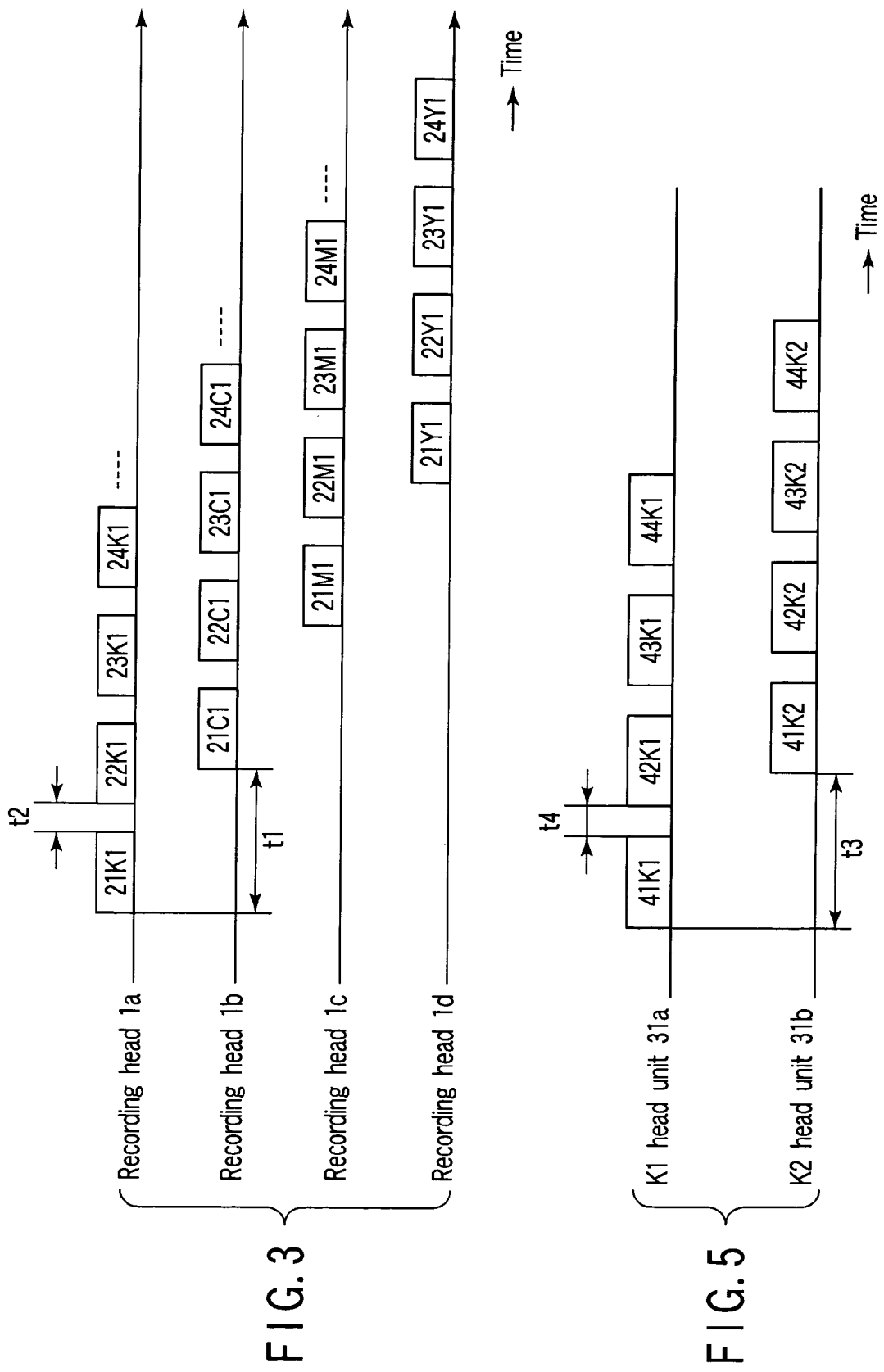
FIG. 3 is a timing chart of data transfer and image formation, showing the image formation in the first embodiment.

FIG. 3 shows timings to form the respective image data transferred to four sets of recording heads into images with respect to four continuously conveyed recording mediums, and an image forming time (abscissa indicates time).

Here, image data of ink of black K are denoted with 21K, 22K, 23K, 24K, and time required for the image formation of these data is denoted with 21K1, 22K2, 23K3, 24K4. The image data of cyan C are denoted with 21C, 22C, 23C, 24C, and time required for the image formation is denoted with 21C1, 22C2, 23C3, 24C4. The image data of magenta M are denoted with 21M, 22M, 23M, 24M, and time required for the image formation is denoted with 21M1, 22M2, 23M3, 24M4. Furthermore, the image data of yellow Y are denoted with 21Y, 22Y, 23Y, 24Y, and time required for the image formation is denoted with 21Y1, 22Y2, 23Y3, 24Y4.

Moreover, time t1 in FIG. 3 is time obtained by dividing an offset amount (distance between the recording heads) between the recording heads by a conveying speed of the recording medium, and time t2 is time obtained by dividing an interval (or an interval between image regions of a page unit) between the conveyed recording mediums by the conveying speed of the recording medium. It is to be noted that the conveying speed of the recording medium is constant. Therefore, lengths of time t1 and t2 relatively indicate distances.

It is to be noted that this example shows a state in which the offset amount (or time t1) between the recording heads is larger (longer) than a recording medium interval (or time t2). Here, the offset amount is defined by a physical size of members constituting the recording head or peripheral members, and a recording medium interval is defined by a processing time of data transfer or the like. Therefore, the smaller (shorter) amount or interval is better regardless of a size relation. Assuming that the conveying speed of the recording medium is constant, the shorter the time t1 is, the shorter the image forming time required for one recording medium becomes. The shorter the time t2 is, that is, the smaller the recording medium interval is, the more a throughput can be enhanced.

First, as initial setting, a plurality of color image data for forming the image on a plurality of recording mediums are stored in the plain memory 4 from the host computer 12 via the USB controller 8. Moreover, the parameters required for forming the image on a first recording medium 21 by the recording heads 1a to 1d are stored in the respective parameter memories 5 from the CPU 9. It is to be noted that the parameter setting into the parameter memory 5 may be stored after receiving a detection signal of the recording medium by the medium position sensor 10 (see FIG. 2).

Moreover, different parameters can be set for each recording medium in such a manner that the image data of the different recording mediums can be simultaneously formed in the respective recording heads 1a to 1d. That is, usually in a case where the image data is considered by a recording medium unit (page unit), the image forming information (parameters) are the same with respect to the recording heads. However, a case where the image forming information (parameters) differ with the recording medium can also be handled.

Next, when the medium position sensor 10 detects the first recording medium conveyed by the conveying mechanism, the image data to be formed on the recording medium is read from a plurality of image data stored in the plain memory 4, and transferred to the data processing circuit 7. In this case, the image data of an area (address) designated by the parameter is read from the plain memory 4 in synchronization with a head driving synchronous signal of the recording head (here, the recording head 1a) of a most upstream of the medium conveying direction. It is to be noted that the image data read at this time may be the whole image data corresponding to one recording medium, or a part of the data.

Next, when the head driving synchronous signal generation circuit 6 receives a signal indicating that there is the recording medium from the medium position sensor 10, head driving synchronous signals corresponding to the respective recording heads 1a to 1d are generated in accordance with the designated parameter in consideration of a delay time (here, time t1) corresponding to the offset amount among the recording heads 1a to 1d at a time when receiving the signal indicating that there is the recording medium. These delay amounts are determined by counting encoder signals generated by the encoder 11 and synchronized with the medium conveying speed. The recording head driving circuits 2a to 2d refer to the head driving synchronous signal, and drive the recording heads 1a to 1d in synchronization with the encoder signal synchronized with the conveying of the recording medium.

Therefore, as to the head driving synchronous signal generated by the head driving synchronous signal generation circuit 6, the offset amount among the recording heads 1a to 1d, that is, the time t1 is delayed and asserted from the signal indicating the presence of the medium, and negated by the ending of the image formation.

Concretely, the first K image data 21K is transferred to the recording head 1a, and the image is formed on the recording medium at a time denoted with 21K1 based on the image data 21K as shown in FIG. 3. Thereafter, the recording medium is moved to the downstream side, and the next image data 22K starts to be transferred to the recording head 1a in the interval to the next recording medium, that is, for the time t2. At this time, the parameter is changed, if necessary. Thereafter, image formation 22K1 is performed with respect to the subsequently conveyed recording medium.

Moreover, the image data 21C starts to be transferred to the recording head 1b disposed on the downstream side of the medium conveying direction within the time t1 corresponding to the offset amount, and the image is formed on the image 21K1 already formed on the previous recording medium in a time denoted with 21C1 based on the image data 21C. Subsequently, in the recording heads 1c, 1d, the transfer and image formation of the image data M, Y are performed after time t1 corresponding to the offset amount.

In the constitution of the present embodiment, since the data controller is disposed for each recording head, the setting of the parameter into the image data processing circuit, and the transfer of the image data into the recording heads 1a to 1d can be independently performed for each recording head. Therefore, even when the recording head 1b on the downstream side from the recording head 1a is forming the image by the image data C (e.g., 21C) as described above, the transfer, parameter change, and image formation of the image data K (e.g., 22K) of the next page are possible with respect to the recording head 1a on the upstream side.

Consequently, unlike the conventional art, the color image data of each color, obtained by adding white data before/after the image data, is not transferred or formed into the image at the same timing (actually the image data of each color is offset, and the image is formed in order of K, C, M and Y). Therefore, the interval between the conveyed recording mediums is not limited to the distance from the recording head on the upstream side to that on the downstream side.

As described above, according to the image forming apparatus of the first embodiment, the transfer of the image data to each recording head or the setting of the parameter to the data processing circuit is performed independently, and the image is formed for each recording head independently. Consequently, in the present embodiment, unlike the conventional art, any blank white data does not have to be added to the image data. Although the recording head of a color other than the corresponding color forms the image, the image of the corresponding color can be formed. Therefore, the interval between the conveyed recording mediums can be remarkably narrowed, and enhancement of throughput can be realized.

Next, a second embodiment of the present invention will be described.

Figure 4:
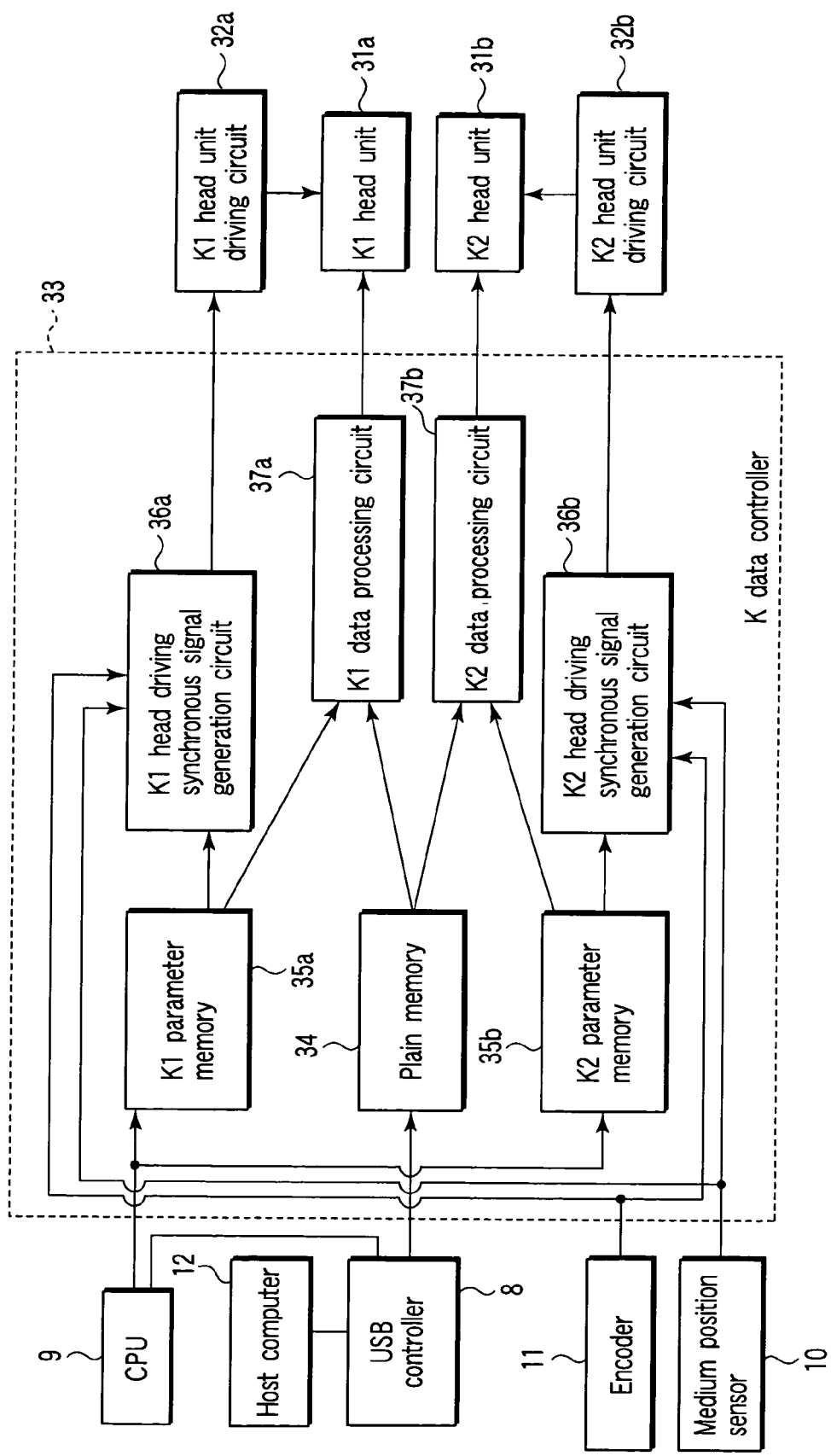
FIG. 4 is a diagram showing a constitution example of an image forming apparatus according to a second embodiment.

FIG. 4 shows a constitution example of an image forming apparatus according to a second embodiment.

Figure 16:
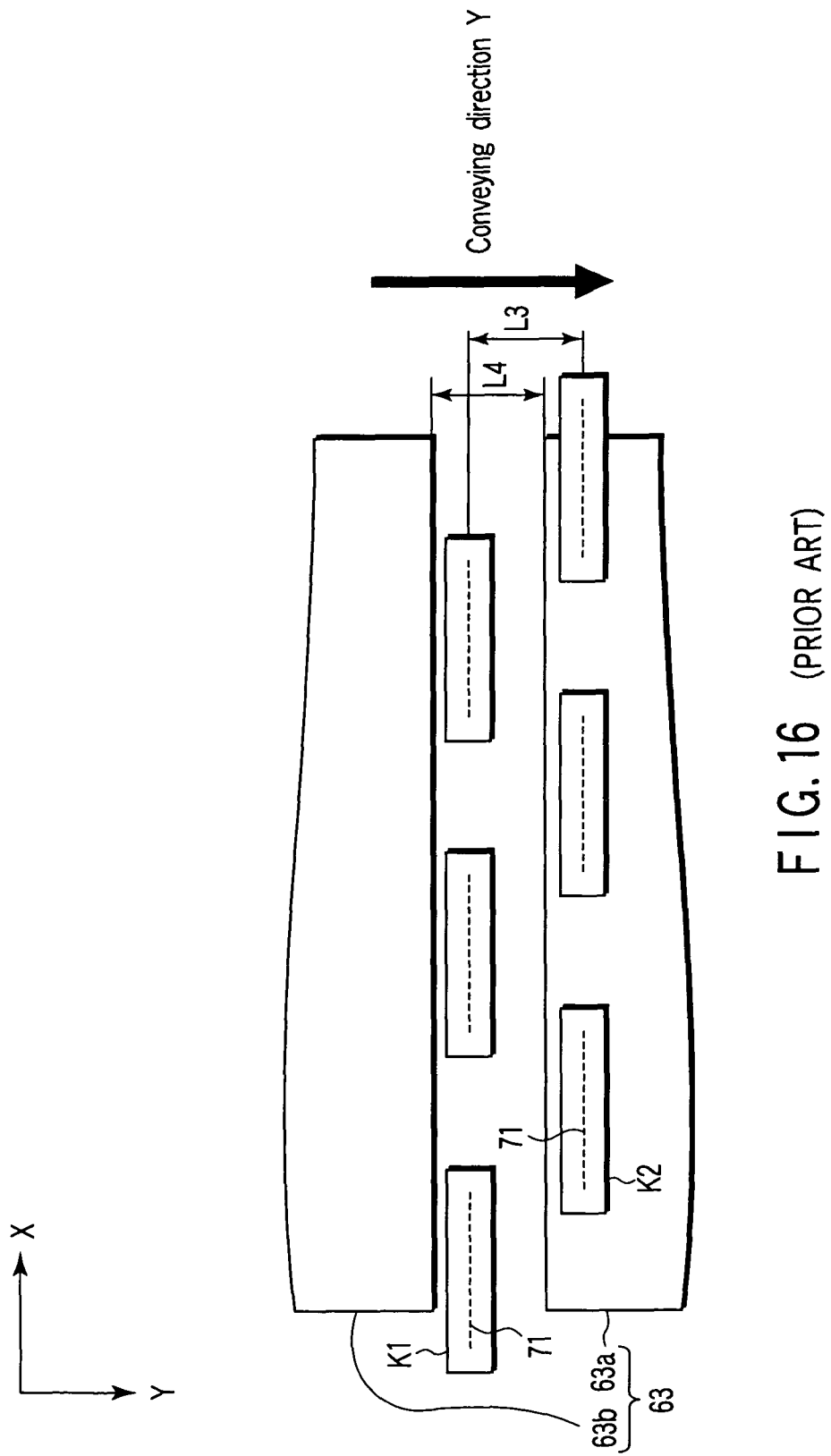
FIG. 16 is a diagram showing one constitution example of a recording head constituted of a plurality of head units alternately arranged in the conveying direction of the recording medium.

The present embodiment is applied to a recording head comprising a plurality of head units arranged in two rows at an interval corresponding to a nozzle row interval L3 alternately in a medium conveying direction as shown in FIG. 16. This apparatus, for example, of an ink jet system comprises at least four sets of recording heads, and forms a color image using four different colors of ink [e.g., black (K), cyan (C), magenta (M), and yellow (Y)]. Here, a constitution example of the recording head 1a shown in FIG. 1 will be described, this applies to the other recording heads 1b to 1d, and therefore description thereof is omitted.

Moreover, the recording head 1a also comprises n K1 to Kn head units, and one image is prepared by divided images formed by the respective head units. Here, a K1 head unit and a K2 head unit having the nozzle row interval L3 will be described as typical examples. It is to be noted that in FIG. 4, constituting portions similar to those of FIG. 2 are denoted with the same reference numerals.

These K1, K2 head units 31a, 31b are driven by K1, K2 head unit driving circuits 32a, 32b, respectively, and spout black (K) ink to a conveyed recording medium (not shown) to thereby form divided images. These K1, K2 head units 31a, 31b and K1, K2 head unit driving circuits 32a, 32b are driven/controlled by a K data controller 33. In the present embodiment, at least one K data controller 33 is disposed for each head unit. That is, at least four data controllers are disposed in a recording head comprising four sets of head units. By this constitution, it is possible to set recording timings or parameters for the respective head units of each recording head as described later.

This K data controller 33 comprises: a plain memory 34, K1, K2 parameter memories 35a, 35b, K1, K2 head driving synchronous signal generation circuits 36a, 36b, and K1, K2 data processing circuits 37a, 37b. Among these components, the plain memory 34 stores image data of a plurality of images. The K1, K2 parameter memories 35a, 35b store parameters for appropriately driving the K1, K2 head units 31a, 31b. The K1, K2 head driving synchronous signal generation circuits 36a, 36b generate head driving synchronous signals, and send the signals to the K1, K2 head unit driving circuits 32a, 32b. The K1, K2 data processing circuits 37a, 37b read the image data based on a designated area (or an address indicating a range) from the plain memory 34, and transfer the data to the K1, K2 head units 31a, 31b. Furthermore, the K data controller 33 is provided with a USB controller 8, a CPU 9, a medium position sensor 10, and an encoder 11 as described above.

The parameters are information on the image formation. Concretely, the parameters are constituted of start end and terminal end information of the image data, address indicating a formed image data region, address (nozzle number) of the nozzle of the head unit to be driven, timing correction information for driving each nozzle and the like. The parameters of the image forming information may include correction parameters for correcting fluctuations in manufacturing the recording heads.

The image formation in the second embodiment will be described with reference to timing charts of the image formation shown in FIGS. 4, 16, and 5.

FIG. 5 shows image forming timings of image data of black K with respect to four continuously conveyed recording mediums, and an image forming time. It is to be noted that here image data transferred to the K1 head unit 31a are denoted with 41Ka, 42Ka, 43Ka, 44Ka, and image data transferred to the K2 head unit 31b are denoted with 41Kb, 42Kb, 43Kb, 44Kb. In this case, time required for the image formation by the K1 head unit 31a is denoted with 41K1, 42K1, 43K1, 44K1, and time required for the image formation by the K2 head unit 31b is denoted with 41K2, 42K2, 43K2, 44K2.

Moreover, a time t3 in FIG. 5 is time obtained by dividing an offset amount L3 (distance between nozzle rows) between the nozzle rows by a conveying speed of the recording medium. A time t4 is time obtained by dividing an interval (or an interval between a rear end of a previously conveyed recording medium and a tip of a subsequently conveyed recording medium) L4 between two conveyed mediums by the conveying speed of the recording medium. Here, it is assumed that the conveying speed of the recording medium is constant. Therefore, lengths of the time t3 and t4 relatively indicate distances. It is to be noted that this example shows a state in which a recording medium interval (or the time t4) is smaller (shorter) than the interval (or the time t3) between the nozzle rows, and the image formation is started from the tip of the recording medium.

First, K image data constituting a part of a plurality of color image data for forming an image on a plurality of recording mediums is stored into the plain memory 34 from the host computer 12 via the USB controller 8. Moreover, parameters necessary for forming the image on a first recording medium 41 by the K1, K2 head units 31a, 31b are stored in the respective parameter memories 35a, 35b from the CPU 9. It is to be noted that parameter settings into the K1, K2 parameter memories 35a, 35b may be stored after receiving a detection signal of the recording medium by the medium position sensor 10 (see FIG. 4).

Moreover, in the respective K1, K2 head units 31a, 31b, different parameters may be set for each recording medium in such a manner that the image data can be simultaneously formed on different recording mediums. Accordingly, in a case where the image forming information (parameters) differs with the recording medium, the changing is possible.

Next, when the medium position sensor 10 detects a first recording medium conveyed by a conveying mechanism, the image data 41K is read from a plurality of image data stored in the plain memory 34, and transferred to the K1 data processing circuit 37a. In this case, the image data of an area (address) designated by the parameter is read from the plain memory 34 in synchronization with the head driving synchronous signal with respect to the K1 head unit 31a.

Next, on receiving a recording medium presence signal from the medium position sensor 10, the K1 head driving synchronous signal generation circuit 36a generates a K1 head driving synchronous signal in accordance with the timing of the recording medium presence signal. Since the K1 head unit 31a is disposed in a most upstream side, delaying by an offset L3 does not have to be performed.

Moreover, on receiving the recording medium presence signal from the medium position sensor 10, the K2 head driving synchronous signal generation circuit 36b generates a K2 head driving synchronous signal obtained by applying an offset amount L3, that is, a delay time (here, time t3) corresponding to the interval between the head units to the timing of the recording medium presence signal in accordance with the designated parameter. It is to be noted that after receiving the medium presence signal, the head driving synchronous signal is generated, and invalidated by the ending of an image forming process with respect to the recording medium.

This will be described in accordance with a concrete example. For example, as shown in FIG. 16, in a case where the image data 41K is formed into an image by two rows of head units, six head units in total, the image data 41K is image data divided into six in a width direction (nozzle arrangement direction of the recording head) of the recording medium. As to the image forming timing, the head units of the rear row are delayed as compared with the head units of the front row. Here, partial image data transferred to a K1 row which is the front row is generically denoted with 41Ka, and partial image data transferred to a K2 row which is the rear row is generically denoted with 41Kb. It is to be noted that in the following description, for the sake of convenience in the description, the recording head unit is constituted of two head units disposed in each of two rows of front As shown in FIG. 5, the transfer of the partial image data 41Ka to the K1 head unit 31a is started, and partial image formation (41K1) based on the image data 41Ka is performed by the K1 head unit 31a with respect to the previously conveyed recording medium. After the image formation, the recording medium is conveyed to the downstream side. After time t4, the next recording medium reaches the K1 head unit 31a. For this time t4, the partial image data 42Ka of an area (address) designated by the parameter is read from the plain memory 34, and starts to be transferred to the K1 data processing circuit 37a. Thereafter, the partial image formation (42K1) on the next recording medium is started by the K1 head unit 31a.

On the other hand, the previous recording medium reaches the next K2 head unit 31b after a delay time t3 corresponding to the offset amount L3. For this time t3, the partial image data 41Kb of the area (address) designated by the parameter is read from the plain memory 34, and starts to be transferred to the K2 data processing circuit 37b. Moreover, after elapse of t3, the partial image is formed adjacent to the previous recording medium image (image formed during the image forming time shown by 41K1) by the K2 head unit 31b (41K2).

In the constitution of the present embodiment, since the data controller is disposed for each head unit, the setting of the parameter into the image data processing circuit, and the transfer of the image data into the K1, K2 head units 31a, 31b can be independently performed for each head unit. Consequently, unlike the conventional art, any blank white data does not have to be added to the image data. In the recording head 1a for forming the image of black K, even when the K2 head unit 31b on the downstream side from the K1 head unit 31a is forming the image by the partial image data 41Kb, the transfer, parameter change, and image formation of the next partial image data 42Ka are possible with respect to the K1 head unit 31a on the upstream side. This eliminates a limitation that the interval between the conveyed recording mediums be larger than the interval between the nozzle rows. The limitation is caused in a conventional art in which the image data including the added white data of the same page is transferred together to a plurality of head units, or all the parameters are set at the same time.

As described above, according to the image forming apparatus of the second embodiment, the transfer of the image data to each head unit or the setting of the parameter to the data processing circuit is performed independently, and the image is formed for each head unit independently. Consequently, the interval between the conveyed recording mediums can be remarkably narrowed, and enhancement of throughput can be realized.

Next, a third embodiment will be described.

In the first and second embodiments, the head driving synchronous signal is generated. Based on a timing at which the recording medium is detected, the image data is transferred, and the image is formed in accordance with the offset amount of the recording head or the head unit. On the other hand, in the present embodiment, this is realized using a simply constituted delay circuit.

Figure 6:
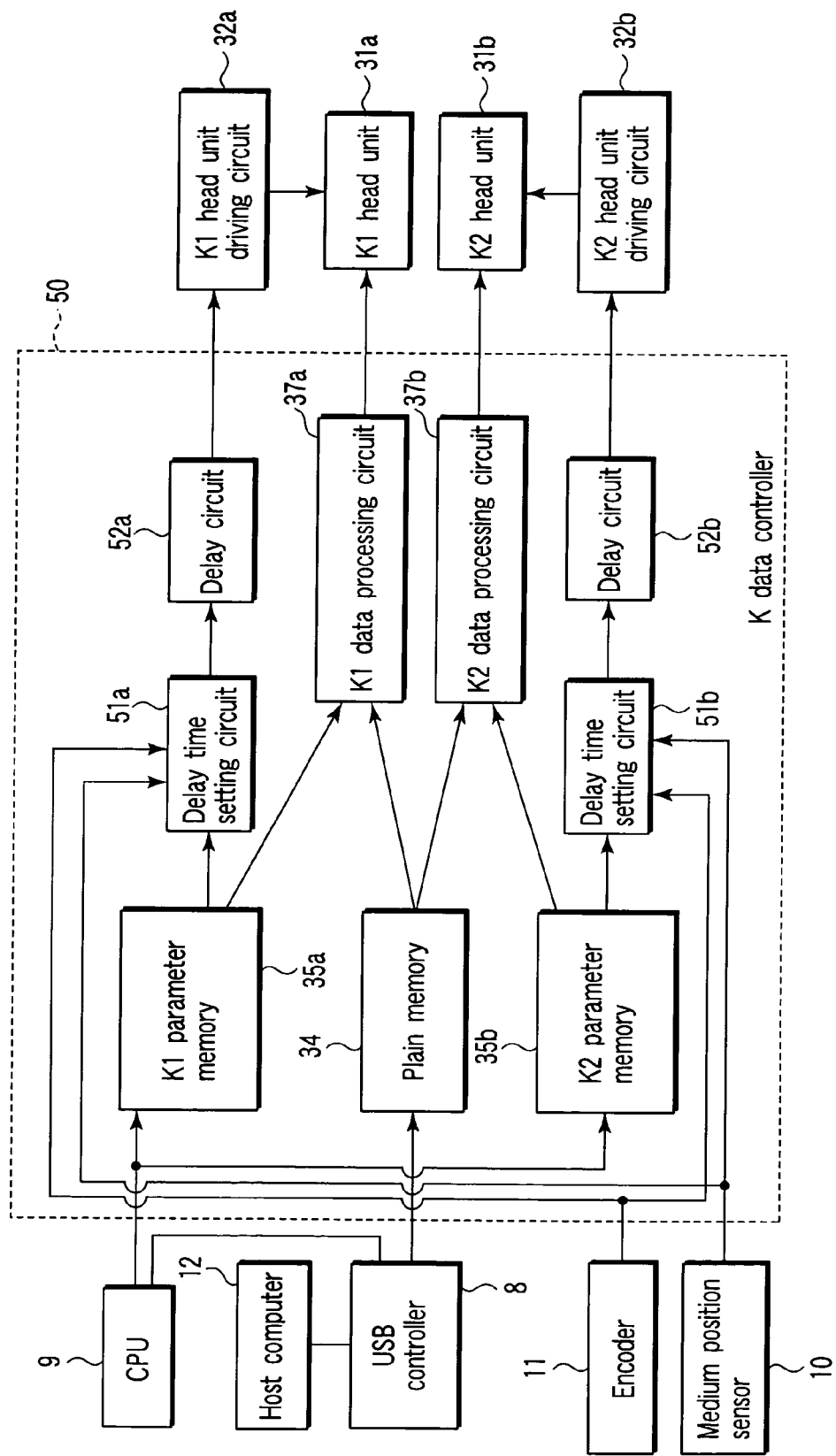
FIG. 6 is a diagram showing a constitution example of an image forming apparatus according to a third embodiment.

FIG. 6 shows a constitution example of an image forming apparatus according to a third embodiment.

In the constitution example, a recording head comprises head units arranged in the same manner as in the second embodiment. Therefore, in this constitution example, an image of black K is formed. It is to be noted that in FIG. 6, constituting portions similar to those of FIG. 4 are denoted with the same reference numerals.

In this constitution, driving timings for driving K1, K2 head unit driving circuits 32a, 32b are determined by delay time setting circuits 51a, 51b and delay circuits 52a, 52b disposed in a K data controller 50. At least one set of delay time setting circuit 51 and delay circuit 52 is disposed for each head unit or head unit row. That is, one set of delay time setting circuit 51 and delay circuit 52 may be disposed for each head unit. When a plurality of head units are arranged in two rows, the delay time setting circuit 51 and delay circuit 52 may be disposed for each row.

The delay time setting circuit 51 sets a delay time determined based on a movement speed of a recording medium to the delay circuit 52 beforehand using a detection signal of a recording medium by a medium position sensor 10. The image data is transferred to the head unit, and the image is formed by the head unit driving circuit by the delay time by the delay circuit.

As described above, according to the third embodiment, the image forming timings or parameters can be set independently for each head unit in the same manner as in the second embodiment under simple control, and unlike the conventional art, the blank white data does not have to be particularly added to the image data. Therefore, it is possible to remarkably reduce the interval of the conveyed recording medium, and enhancement of throughput can be realized. It is to be noted that when any parameter is not set, and the image forming timing (image forming position) is simply adjusted, the delay time setting circuit and delay circuit may be disposed in the respective recording heads instead of the data controller 3 shown in FIG. 1.

It is to be noted that in the above-described embodiments, a color image is formed by four colors using four recording heads, but the present invention is not limited to the embodiments, and the arrangement order or the number of the heads may be appropriately changed in accordance with the specifications. Further in each embodiment, the printer using the ink head has been described as an example for forming the image on the recording medium, but, needless to say, the present invention is not limited to this, and the present invention can be easily applied to an image forming apparatus such as a copying machine. The recording medium may be any flat member on whose surface the image can be formed, for example, paper such as mainly a recording sheet and a resin. Furthermore, the constituting portions described in the respective embodiments and modifications may be combined, and several constituting portions may be deleted or carried out if necessary.

According to the present invention, the image data is independently transferred to each recording head, or the parameters are independently set in the data processing circuit. Accordingly, it is possible to remarkably narrow the interval between the conveyed recording mediums without being influenced by the distance between the recording heads, only in consideration of a time required for transferring the data or setting the parameters.

Next, an image forming apparatus will be described according to a fourth embodiment of the present invention.

Figure 7:
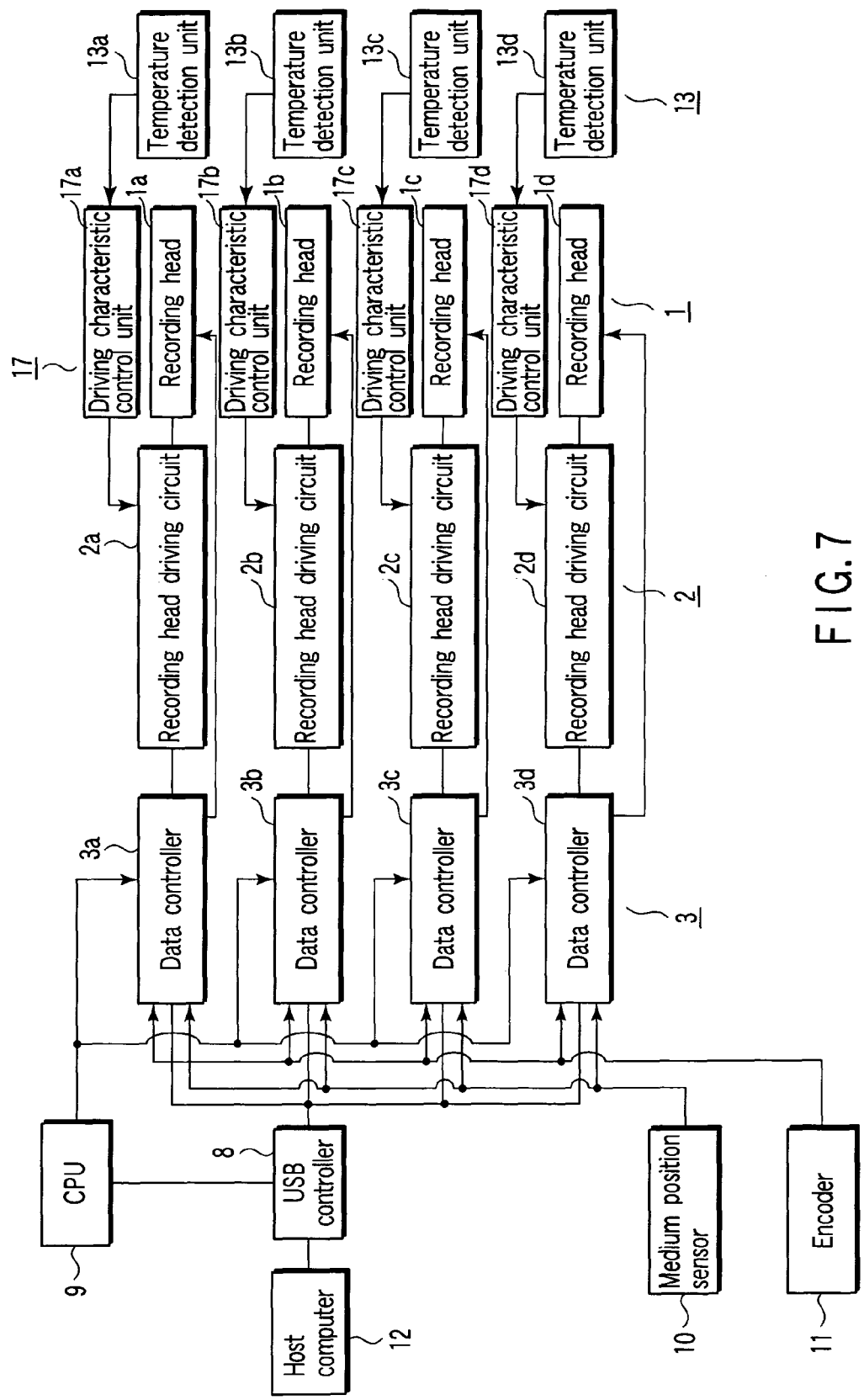
FIG. 7 is a diagram showing a constitution example of an image forming apparatus according to a fourth embodiment of the present invention.

In the present embodiment, an image forming apparatus shown in FIG. 7, of an ink jet system, comprises at least four sets of recording heads 1 (1a to 1d), and forms a color image using four different colors of ink [e.g., black (K), cyan (C), magenta (M), and yellow (Y)]. In this constitution, constituting portions similar to those shown in FIG. 1 described above are denoted with the same reference numerals, and detailed description thereof is omitted.

In the present embodiment, the recording heads 1a to 1d have a constitution comprising nozzle rows (not shown) in which a plurality of nozzles are arranged in one row with a length exceeding a transverse width of the recording medium. These recording head 1 and a recording head driving circuit 2 (2a to 2d) are driven/controlled by a data controller 3 (3a to 3d). The recording head driving circuit 2 generates a driving voltage indicated by a driving characteristic control unit 17 (17a to 17d) having a function of controlling a driving characteristic of the recording head based on the detected temperature of the recording head. The driving characteristic control unit 17 includes at least a voltage control unit. The driving characteristic of the recording head 1 is controlled by the control of the driving characteristic control unit 17. It is to be noted that here the driving characteristic indicates an ink spout amount spouted from the nozzle row (storage element row) disposed, for example, in each of the recording heads 1a to 1d. When the driving voltage applied to each recording head is changed, density, hue and the like of the image can be controlled.

Moreover, a temperature detection unit 13 (13a to 13d) for detecting the temperature of an ink spout unit in which nozzle rows are disposed is disposed. These temperature detection units 13 measure the temperature of the ink spout unit of the recording head 2, and output a detected temperature detection signal to the driving characteristic control unit 17. Based on this temperature detection signal, the driving characteristic control unit 17 outputs a voltage control signal for adjusting the ink spout amount to the recording head driving circuit 2 in such a manner that the image density is homogenized or adjusted to be appropriate. The recording head driving circuit 2 applies a driving voltage (voltage value) in accordance with the voltage control signal, and changes the driving characteristic of the recording head 1. It is to be noted that an application time of the driving voltage may be changed in addition to the voltage value of the driving voltage.

In the present embodiment, at least one data controller 3 is disposed for each recording head 1. That is, in a constitution comprising four sets of recording heads 1a to 1d, at least four data controllers 3a to 3d are disposed, image data can be transferred for each recording head 1, and the image forming timing or parameter can be set for each recording head.

Figure 8:
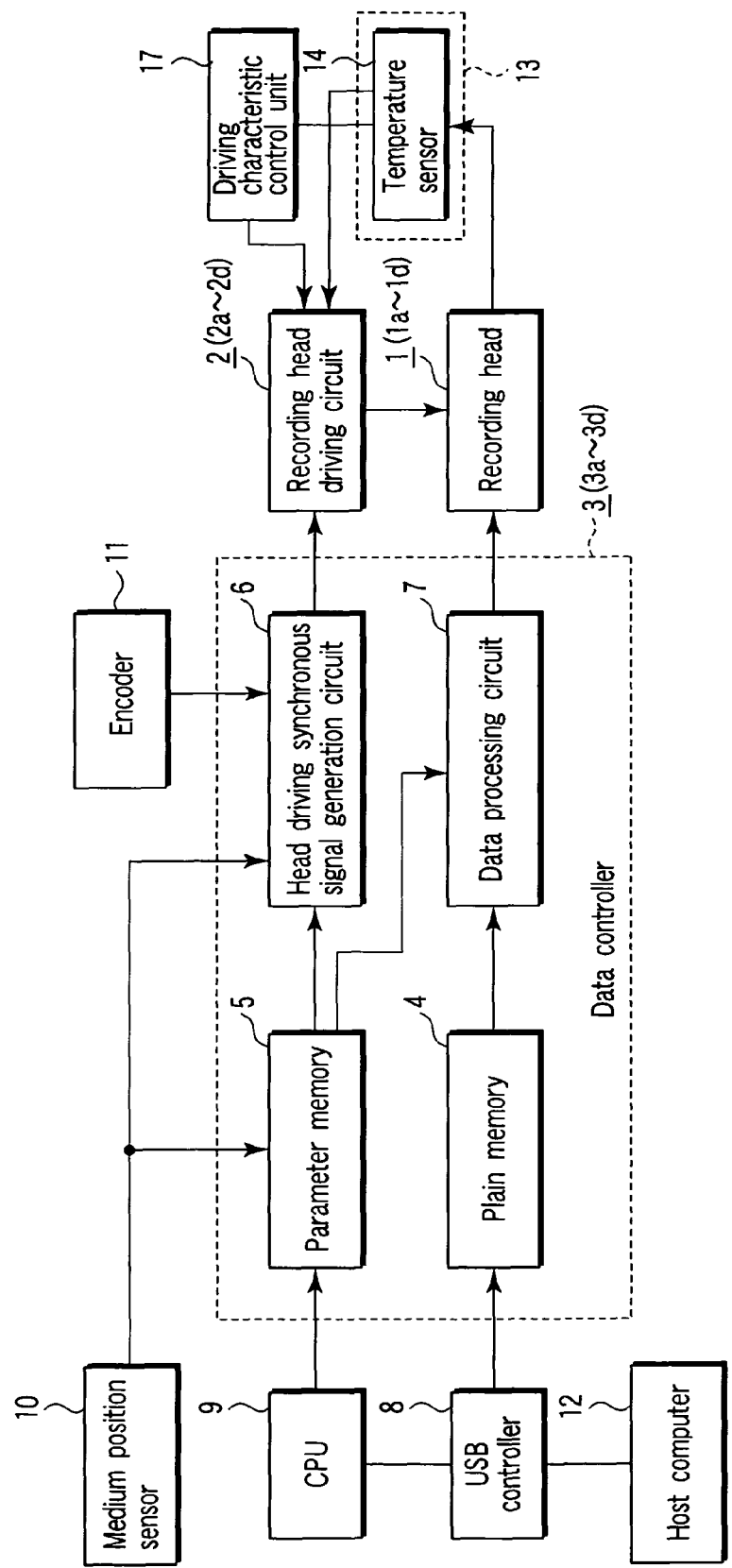
FIG. 8 is a diagram showing a constitution example of a data controller in the fourth embodiment.

As shown in FIG. 8, these data controllers 3a to 3d comprise a plain memory 4, a parameter memory 5, a head driving synchronous signal generation circuit 6, and a data processing circuit 7. Even in this constitution, constituting portions similar to those shown in FIG. 2 are denoted he thermistor. Furthermore, a sensor for detecting the spout of the recording medium on which the image has been formed may be disposed.

Next, image formation in the fourth embodiment will be described with reference to a timing chart of the image formation shown in FIG. 9.

FIG. 9 shows timings to form the respective image data transferred to four sets of recording heads into images with respect to four continuously conveyed recording mediums, and an image forming time (abscissa indicates time). Here, the image data of ink of black K are denoted with 21K, 22K, 23K, 24K, and time required for the image formation of these data is denoted with 21K1, 22K2, 23K3, 24K4. The image data of cyan C are denoted with 21C, 22C, 23C, 24C, and time required for the image formation is denoted with 21C1, 22C2, 23C3, 24C4. The image data of magenta M are denoted with 21M, 22M, 23M, 24M, and time required for the image formation is denoted with 21M1, 22M2, 23M3, 24M4. Furthermore, the image data of yellow Y are denoted with 21Y, 22Y, 23Y, 24Y, and time required for the image formation is denoted with 21Y1, 22Y2, 23Y3, 24Y4.

Moreover, time t5 in FIG. 9 is time obtained by dividing an offset amount (distance between the recording heads) between the recording heads by a conveying speed of the recording medium, and time t6 is time obtained by dividing an interval (or an interval between image regions of a page unit) between the conveyed recording mediums by the conveying speed of the recording medium. It is to be noted that the conveying speed of the recording medium is constant. Therefore, lengths of the time t5 and t6 relatively indicate distances.

It is to be noted that this example shows a state in which the offset amount (or time t5) between the recording heads is larger (longer) than a recording medium interval (or time t6). Here, the offset amount is defined by a physical size by members constituting the recording head or peripheral members, and a recording medium interval is defined by a processing time of data transfer or the like. Therefore, the smaller (shorter) amount or interval is better regardless of a size relation. Assuming that the conveying speed of the recording medium is constant, the shorter the time t5 is, the shorter the image forming time required for one recording medium becomes. The shorter the time t6 is, that is, the smaller the recording medium interval is, the more a throughput can be enhanced.

Next, an image forming operation will be described. It is to be noted that description of an image forming operation similar to that of the first embodiment is simplified.

First, as initial setting, a plurality of color image data are stored in the plain memory 4 from the host computer 12 via the USB controller 8. The parameters required for forming the image are stored in the respective parameter memories 5. It is to be noted that the parameter setting may be stored after detecting the recording medium by the medium position sensor 10 (see FIG. 8).

Moreover, different parameters (image forming information) may be set to each recording medium in such a manner that image data of different recording mediums may be formed simultaneously by the respective recording heads 1a to 1d.

Moreover, different parameters (image forming information) can be set for each recording medium in such a manner that the image data of the different recording mediums can be simultaneously formed in the respective recording heads 1a to 1d.

Next, when the medium position sensor 10 detects the first conveyed recording medium, the image data to be formed on the recording medium is read from a plurality of image data recorded in the plain memory 4, and transferred to the data processing circuit 7.

In this case, the image data of an area (address) designated by the parameter is read from the plain memory 4 in synchronization with a head driving synchronous signal of the recording head (here, the recording head 1a) of a most upstream of the medium conveying direction. It is to be noted that the image data read at this time may be the whole image data corresponding to one recording medium, or a part of the data.

Next, when the head driving synchronous signal generation circuit 6 receives a recording medium presence signal from the medium position sensor 10, delay (here, time t5) corresponding to the offset amount is generated in accordance with the designated parameter, and head driving synchronous signals corresponding to the respective recording heads 1a to 1d are generated. These delay amounts are determined by counting encoder signals generated by the encoder 11 and synchronized with the medium conveying speed.

The recording head driving circuits 2a to 2d refer to the head driving synchronous signal, and drive the recording heads 1a to 1d in synchronization with the encoder signal synchronized with the conveying of the recording medium.

Therefore, as to the head driving synchronous signal generated by the head driving synchronous signal generation circuit 6, the offset amount among the recording heads 1a to 1d, that is, the time t5 is delayed and asserted from the medium presence signal, and negated by the ending of the image formation.

Moreover, the head driving synchronous signal generation circuit 6 calculates a medium gap between the preceding conveyed recording medium and the following conveyed recording medium from a detection result of the medium position sensor 10, and selects the recording head in which a recording region of a recording element row, that is, a nozzle row faces the medium gap from the recording heads 1a to 1d. An instruction signal (timing) indicating that the driving voltage of the recording head is changeable is output to the driving characteristic control unit 17.

Concretely, the first K image data 21K is transferred to the recording head 1a, and the image is formed on the recording medium at a time denoted with 21K1 based on the image data 21K as shown in FIG. 9. Thereafter, the recording medium is moved to the downstream side, and the next image data 22K starts to be transferred to the recording head 1a in the interval to the next recording medium, that is, for the time t6. At this time, the parameter is changed, if necessary. Thereafter, image formation 22K1 is performed with respect to the subsequently conveyed recording medium.

Moreover, the image data 21C starts to be transferred to the recording head 1b disposed on the downstream side of the medium conveying direction within the time t5 corresponding to the offset amount, and the image is formed on the image 21K1 already formed on the previous recording medium in a time denoted with 21C1 based on the image data 21C. Subsequently, in the recording heads 1c, 1d, the transfer and image formation of the image data M, Y are performed after time t5 corresponding to the offset amount.

As described above, according to the present embodiment, since the data controller 3 is disposed for each recording head 1, the setting of the parameter into the image data processing circuit, and the transfer of the image data into the recording heads 1a to 1d can be independently performed for each recording head. Therefore, even when the recording head 1b on the downstream side from the recording head 1a is forming the image by the image data C (e.g., 21C) as described above, the transfer and parameter change of the image data K (e.g., 22K) of the next page are possible with respect to the recording head 1a on the upstream side, and further the driving voltage can be changed. This eliminates a limitation on a timing to adjust the voltage accompanying the temperature change of the recording head during the image formation. The limitation is caused by a conventional art in which the data is transferred together to the recording head, or all the parameters are set at the same time.

As described above, even when the recording head by the ink jet system is driven with the same driving characteristic, that is, an equal driving voltage, the temperature of the recording head changes, and the spout amount of the ink changes, if the driving time lengthens. Therefore, the density of the image changes. In the present embodiment, as shown in FIG. 7, while the apparatus is operated, the temperature of the recording head 1 is constantly detected, that is, monitored by the temperature detection unit 13 disposed in each recording head 1.

For example, the driving characteristic control unit 17 is provided with a comparison circuit therein, and compares the temperature detection signal detected by the temperature detection unit 13 with a preset reference value. By this reference value, the ink spout amount is adjusted in such a manner that an image having an appropriate density is formed by the recording head. That is, when the temperature detection signal exceeds the reference value, it is assumed that the temperature of the recording head rises. The voltage control signal is generated based on a degree exceeding the reference value, and output to the recording head driving circuit 2. In response to the voltage control signal, the recording head driving circuit 2 lowers the driving voltage, applies the voltage to the recording head 1, and decreases the ink amount spouted from the ink spout unit.

As described above, in each recording head, the driving characteristic, that is, the ink spout amount by the control of the driving voltage can be adjusted at a preferable timing based on the detected head temperature. This timing is set within a time from when the image formation on one recording medium in each recording head 1 ends until the next recording medium reaches the recording head, or within a time from when the image data for one page is formed until the image data of the next page is formed. Concretely, the timing is set within a time t6 shown in FIG. 9.

Therefore, when each recording head 1 is monitored during the driving, and the head temperature rises, the driving voltage is lowered at a preferable timing in accordance with an image forming state of each recording head. Accordingly, the amount of spouted ink is decreased, and the change of the density of the formed image is eliminated. On the other hand, when the head temperature drops, the driving voltage is raised, accordingly the spouted ink amount is increased, and the change of the density of the formed image can be reduced.

Therefore, in a case where the ink spout amount is changed in accordance with the temperature change of the recording head 1, even when another recording head is forming the image, the recording head is not influenced during the image formation. According to the present embodiment, even when the same image is formed on a large number of sheets, a high-quality image can be formed without any difference of the color density between the recording mediums.

A first modification in the temperature detection unit 13 and the driving characteristic control unit 17 will be described with reference to FIG. 10.

In a first modification, the temperature detection unit 13 is constituted of a temperature sensor for detecting the temperature of the ink spout unit of the recording head 1 as described above. The driving characteristic control unit 17 has a driving voltage parameter table 15 in which the temperature of the recording head 1 is associated with the driving voltage with respect to the spouted ink amount beforehand instead of the comparison circuit.

The driving voltage parameter table 15 is referred to for a temperature detection signal detected by the temperature detection unit 13, and a driving voltage parameter is taken out and output to the recording head driving circuit 2. It is to be noted that the driving voltage parameter table 15 is capable of storing a plurality of data in such a manner that the driving voltage can be referred to from a level of spout amount by fluctuations in producing recording heads, ink characteristic, recording medium characteristic and the like. Accordingly, the table can be changed.

The recording head driving circuit 2 generates a corrected driving voltage obtained by multiplying the driving voltage applied to a nozzle of the recording head 1 by the driving voltage parameter, and the nozzle is driven with the corrected driving voltage. A timing for generating the corrected driving voltage to adjust the recording head 1 is set within a time from when the image formation on the preceding recording medium ends until the next recording medium reaches the recording head, or within a time from when the image is formed by the preceding image data before the image is formed by the next image data in the same manner as in the first embodiment. Concretely, the timing is set within a time t6 shown in FIG. 9. At this time t6, a predetermined gap between the recording mediums, so-called a medium gap faces a nozzle row (recording element row) of the recording head 1. According to the modification, the comparison circuit is not required in the recording head driving circuit, and the constitution is simplified as compared with the first embodiment.

A second modification in the temperature detection unit 13 and the driving characteristic control unit 17 will be described with reference to FIG. 11.

In the second modification, the driving characteristic control unit 17 comprises: a driving voltage parameter table 15 provided beforehand with a relation table of the temperature of the recording head with respect to the spouted ink amount; and an ink spout times calculation unit 16 for counting ink spout times in each nozzle from the recording head driving circuit 2.

This ink spout times calculation unit 16 indicates use frequency or use state of the recording head in accordance with ink spout times per unit time as standards of a temperature rise of the recording head 1. The temperature change of the recording head 1 can be predicted by the use frequency. When the use frequency is associated with the driving voltage with respect to the spouted ink amount beforehand in accordance with the temperature detection signal, a signal can be used as a detection signal having good response in an auxiliary manner.

Next, a fifth embodiment of the present invention will be described.

The fourth embodiment relates to a constitution example in which one nozzle row of a recording head is disposed, whereas the present embodiment relates to an example of a recording head comprising a plurality of head units arranged in two rows at a nozzle row interval L3 alternately in a medium conveying direction as shown in FIG. 16. These recording heads are, for example, of an ink jet system, comprise at least four sets of recording heads, and form a color image using four different colors of ink [e.g., black (K), cyan (C), magenta (M), and yellow (Y)]. Here, a constitution example of the recording head 1a shown in FIG. 7 will be described, this also applies to the other recording heads 1b to 1d, and therefore the description is omitted.

Moreover, the recording head 1a comprises n head units K1 to Kn, and one image is prepared by divided images formed by the respective head units. Here, a K1 head unit and a K2 head unit having the nozzle row interval L3 will be described as typical examples. It is to be noted that in FIG. 12, constituting portions similar to those of FIG. 4 are denoted with the same reference numerals. That is, in this constitution, K1, K2 head units 31a, 31b, K1, K2 head unit driving circuits 32a, 32b, and K data controller 33 are similar to constituting members shown in FIG. 4, and the description thereof is omitted. In the present embodiment, at least one K data controller 33 is disposed for each head unit. That is, at least four data controllers are disposed in a recording head comprising four sets of head units. By this constitution, it is possible to set recording timings or parameters for the respective head units of each recording head as described later. In the present embodiment, head units 31a, 31b are provided with a temperature detection unit 38 (38a, 38b) for detecting a temperature of an ink spout unit in which a nozzle row for discharging ink is disposed. These temperature detection units 38 output temperature detection signals indicating detection of temperatures of ink spout units of the head units 31a, 31b to a driving characteristic control unit 39 (39a, 39b). The driving characteristic control unit 39 includes at least a voltage control unit. The driving characteristic control unit 39 output voltage control signals for adjusting ink spout amounts to achieve a uniform or appropriate image density to head unit driving circuits 32a, 32b based on the temperature detection signals. The head unit driving circuits 32a, 32b apply driving voltages in accordance with the voltage control signals, and driving characteristics of the head units 31a, 31b are changed.

Moreover, the temperature detection units 38 comprise temperature sensors such as thermistors or infrared temperature sensors in the same manner as in the fourth embodiment. The temperature detection units 38 may be constituted to include a driving voltage parameter table 15 or an ink spout times calculation unit 16 in the same manner as in first and second modifications. Furthermore, the K data controller 33 is provided with a USB controller 8, a CPU 9, a medium position sensor 10, and an encoder 11 described above.

The parameters are information on image formation, and concretely comprise start end and terminal end information of the image data, address indicating a formed image data region, address (nozzle number) of the nozzle of the head unit to be driven, timing correction information for driving each nozzle and the like. The parameters of the image forming information may include correction parameters for correcting fluctuations in manufacturing the recording heads.

The image formation in the fifth embodiment will be described with reference to timing charts of the image formation shown in FIGS. 12, 16, and 13.

Figure 13:
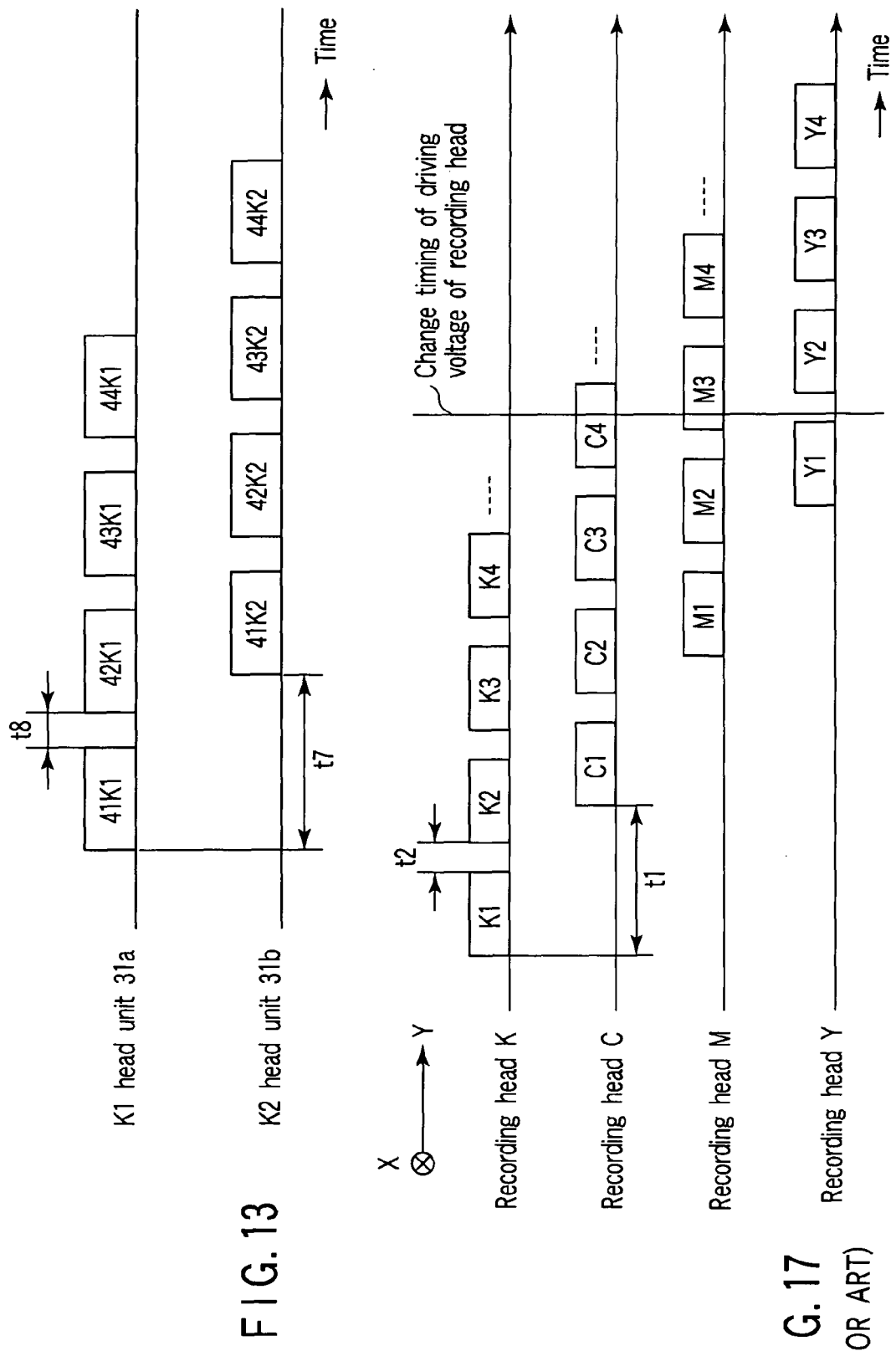
FIG. 13 is a timing chart of image formation, showing the image formation in the fifth embodiment.
Figure 14:
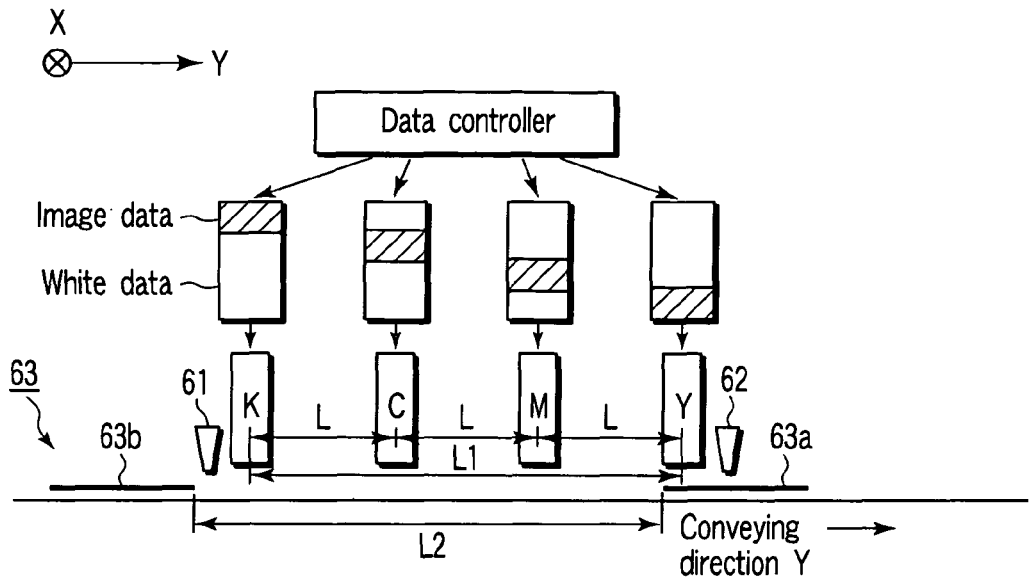
FIG. 14 is a schematic diagram showing a relation of an image forming position between a plurality of recording heads and a recording medium in a conventional image forming apparatus.
Figure 15:
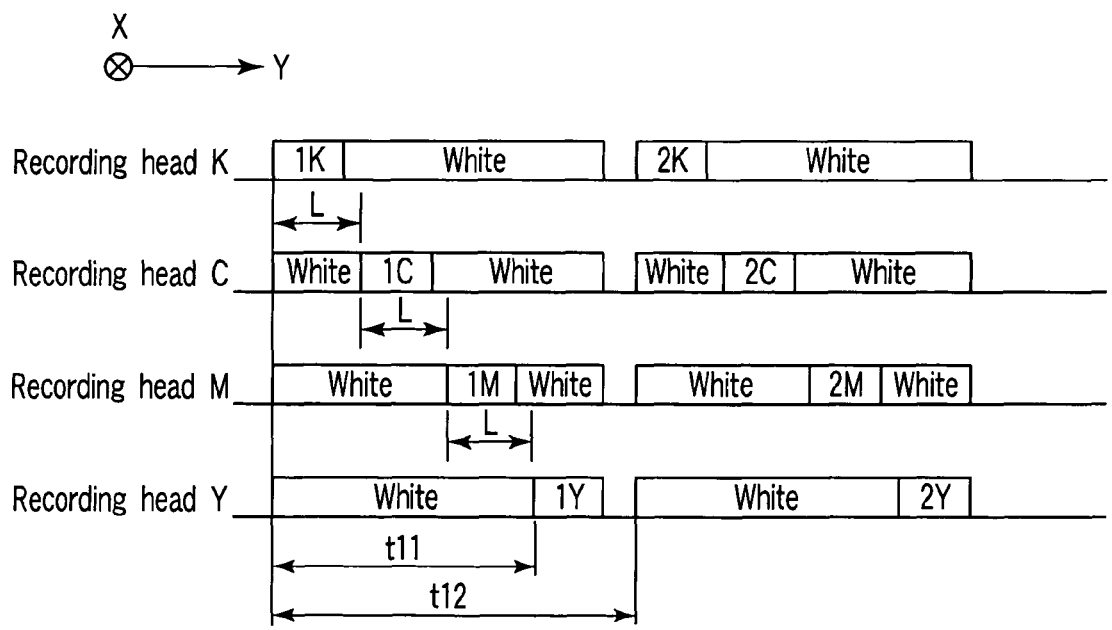
FIG. 15 is a diagram showing one example of each color image data transferred to a plurality of recording heads in the conventional image forming apparatus.

FIG. 13 shows image forming timings of image data of black K with respect to four continuously conveyed recording mediums, and an image forming time. It is to be noted that here image data transferred to the K1 head unit 31*a* are denoted with 41Ka, 42Ka, 43Ka, 44Ka, and image data transferred to the K2 head unit 31*b* are denoted with 41Kb, 42Kb, 43Kb, 44Kb. In this case, time required for the image formation by the K1 head unit 31*a* is denoted with 41K1, 42K1, 43K1, 44K1, and time required for the image formation by the K2 head unit 31*b* is denoted with 41K2, 42K2, 43K2, 44K2.

Moreover, a time t7 in FIG. 13 is time obtained by dividing an offset amount L3 (distance between nozzle rows) between the nozzle rows by a conveying speed of the recording medium as shown in FIG. 16. A time t8 is time obtained by dividing an interval (or an interval between a rear end of a previously conveyed recording medium and a tip of a subsequently conveyed recording medium) L8 between two conveyed mediums by the conveying speed of the recording medium. Here, it is assumed that the conveying speed of the recording medium is constant. Therefore, lengths of the time t7 and t8 relatively indicate distances. It is to be noted that this example shows a state in which a recording medium interval (or the time t8) is smaller (shorter) than the interval (or the time t7) between the nozzle rows, and the image formation is started from the tip of the recording medium.

First, K image data constituting a part of a plurality of color image data for forming an image on a plurality of recording mediums is stored into the plain memory 34 from the host computer 12 via the USB controller 8. Moreover, parameters necessary for forming the image on a first recording medium 41 by the K1, K2 head units 31*a*, 31*b* are stored in the respective parameter memories 35*a*, 35*b* from the CPU 9. It is to be noted that parameter settings into the K1, K2 parameter memories 35*a*, 35*b* may be stored after receiving a detection signal of the recording medium by the medium position sensor 10.

Moreover, in the respective K1, K2 head units 31*a*, 31*b*, different parameters may be set for each recording medium in such a manner that the image data can be simultaneously formed on different recording mediums. Accordingly, in a case where the image forming information (parameters) differs with the recording medium, the changing is possible.

Next, when the medium position sensor 10 detects a first recording medium conveyed by a conveying mechanism, the image data 41K is read from a plurality of image data stored in the plain memory 34, and transferred to the K1 data processing circuit 37*a*. In this case, the image data of an area (address) designated by the parameter is read from the plain memory 34 in synchronization with the head driving synchronous signal with respect to the K1 head unit 31*a*.

Next, on receiving a recording medium presence signal from the medium position sensor 10, the K1 head driving synchronous signal generation circuit 36*a* generates a K1 head driving synchronous signal in accordance with the designated parameter, and the timing of the recording medium presence signal. Since the K1 head unit 31*a* is disposed in a most upstream side, delaying by an offset L3 does not have to be performed.

Moreover, on receiving the recording medium presence signal from the medium position sensor 10, the K2 head driving synchronous signal generation circuit 36*b* generates a K2 head driving synchronous signal obtained by applying an offset amount L3, that is, a delay time (here, time t3) corresponding to the interval between the head units to the timing of the recording medium presence signal in accordance with the designated parameter. It is to be noted that after receiving the medium presence signal, the head driving synchronous signal is generated, and invalidated by the ending of an image forming process with respect to the recording medium.

This will be described in accordance with a concrete example. For example, as shown in FIG. 16, in a case where the image data 41K is formed into an image by two rows of head units, six head units in total, the image data 41K is image data divided into six in a width direction (nozzle arrangement direction of the recording head) of the recording medium. As to the image forming timing, the head units of the rear row are delayed as compared with the head units of the front row. Here, partial image data transferred to a K1 row which is the front row is generically denoted with 41Ka, and partial image data transferred to a K2 row which is the rear row is generically denoted with 41Kb. It is to be noted that in the following description, for the sake of convenience in the description, the recording head unit is constituted of two head units disposed in each of two rows of front and rear rows.

As shown in FIG. 13, the transfer of the partial image data 41Ka to the K1 head unit 31*a* is started, and partial image formation (41K1) based on the image data 41Ka is performed by the K1 head unit 31*a* with respect to the previously conveyed recording medium. After the image formation, the recording medium is conveyed to the downstream side. After time t4, the next recording medium reaches the K1 head unit 31*a*. For this time t4, the partial image data 42Ka of an area (address) designated by the parameter is read from the plain memory 34, and starts to be transferred to the K1 data processing circuit 37*a*. Thereafter, the partial image formation (42K1) on the next recording medium is started by the K1 head unit 31*a*.

On the other hand, the previous recording medium reaches the next K2 head unit 31*b* after a delay time t3 corresponding to the offset amount L3. For this time t3, the partial image data 41Kb of the area (address) designated by the parameter is read from the plain memory 34, and starts to be transferred to the K2 data processing circuit 37*b*. Moreover, after elapse of t3, the partial image is formed adjacent to the previous recording medium image (image formed during the image forming time shown by 41K1) by the K2 head unit 31*b* (41K2).

In the constitution of the present embodiment, since the data controller is disposed for each head unit, the setting of the parameter into the image data processing circuit, and the transfer of the image data into the K1, K2 head units 31*a*, 31*b* can be independently performed for each head unit. Consequently, unlike the conventional art, any blank white data does not have to be added to the image data. In the recording head 1*a* for forming the image of black K, even when the K2 head unit 31*b* on the downstream side from the K1 head unit 31*a* is forming the image by the partial image data 41Kb, the transfer, parameter change, and image formation of the next partial image data 42Ka are possible with respect to the K1 head unit 31*a* on the upstream side. This eliminates a limitation that the interval between the conveyed recording mediums be larger than the interval between the nozzle rows. The limitation is caused in a conventional art in which the image data including the added white data of the same page is transferred together to a plurality of head units, or all the parameters are set at the same time.

Moreover, a limitation on the adjustment timing with respect to the temperature change of the recording head during the image formation, caused by a conventional art in which data transfer or parameter setting is performed to the head unit all at once, is eliminated.

As described above, according to the fifth embodiment, while the apparatus is operated, temperatures of the head units 31*a*, 31*b* are constantly detected, that is, monitored by the temperature detection units 38 disposed in the K1, K2 head units 31*a*, 31*b* in the same manner as in the fourth embodiment.

Furthermore, even in the driving characteristic control unit 39, the temperature detection signal detected by the temperature detection unit 38 is compared with a preset reference value, and the voltage control signal for forming an image having an appropriate density is generated, and output to the head unit driving circuits 32*a*, 32*b*.

The head unit driving circuits 32*a*, 32*b* generate driving voltages in which the voltage control signals are reflected, and apply the voltages to the head units 31*a*, 31*b* at preferable timings. In the respective head units 31*a*, 31*b*, ink spout amounts are adjusted in accordance with applied driving voltages. In the head units 31*a*, 31*b*, this preferable timing is set within a time from when the image formation on one recording medium ends until the next recording medium reaches the head units 31*a*, 31*b*, or within a time from when the image of the preceding formed image data is formed before the image of the next formed image data is formed. Concretely, the timing is set within a time t6 shown in FIG. 9.

Therefore, in a case where the ink spout amount is changed in accordance with the temperature change of the head unit 31*a* on the upstream side, even when the head unit 31*b* on the downstream side is forming the image, the head unit 31*b* is not influenced. According to the present embodiment, even when the same image is formed on a large number of sheets, a high-quality image can be formed without any difference of the color density between the recording mediums.

It is to be noted that in the above-described embodiments, a color image is formed by four colors using four recording heads, but the present invention is not limited to the embodiments, and the arrangement order or the number of the heads may be appropriately changed in accordance with the specifications. Further in each embodiment, the printer using the ink head has been described as an example for forming the image on the recording medium, but, needless to say, the present invention is not limited to this, and the present invention can be easily applied to an image forming apparatus such as a copying machine. The recording medium may be any flat member on whose surface the image can be formed, for example, paper such as mainly a recording sheet and a resin. Furthermore, the constituting portions described in the respective embodiments and modifications may be combined, and several constituting portions may be deleted or carried out if necessary.

In the image forming apparatus of the present invention, the transferring of the image data or the setting of the parameters of the data processing circuit is performed independently for each recording head or head unit. Therefore, even when there is the recording head or head unit that is forming the image, the image data is rewritten or the parameter is set in another recording head or head unit. Accordingly, an interval between the preceding recording medium and the next conveyed recording medium can be set to be short regardless of the interval between the recording heads or the nozzle rows in the medium conveying direction. An image forming efficiency can be enhanced to thereby raise throughput. In the image forming apparatus of the present invention, the data controller is disposed for each recording head driving circuit, and independently driven/controlled. The parameters are rewritten, or driving characteristics of the recording head, such as a driving voltage, are changed at the preferable timing. Moreover, the driving voltage of the recording head, output by the recording head driving circuit, is independently changed to thereby control the ink spout amount based on the temperature detection signal of the recording head detected by the temperature detection unit disposed in each recording head. Therefore, the change of the density of the formed image can be reduced. Consequently, the image forming efficiency can be enhanced to thereby raise throughput, and high-quality image formation can be realized.

What is claimed is:

1. An image forming apparatus comprising:
   a plurality of recording heads having recording element rows arranged so as to extend in a direction crossing a conveying direction of a recording medium at right angles, wherein a plurality of head units each having a nozzle row whose recording width is smaller than a width of the recording medium are spaced apart from each other in at least two rows and arranged alternately with no gap disposed therebetween as seen from the conveying direction to form a recording element row for each recording head, and wherein the plurality of recording heads are arranged at an interval along the conveying direction by the recording element rows;
   a plurality of data control units which respectively divide image data into partial image data for recording ranges by the nozzle rows of the plurality of head units, which respectively generate image data corresponding to the recording element rows, and which respectively set transfer timings of the image data, image formation timings, and parameters for driving the plurality of recording heads;
   a plurality of recording head driving units which respectively drive the plurality of recording heads at the set formation timings;
   a medium position detection unit which detects position information of the conveyed recording medium; and
   a plurality of driving characteristic control units which respectively control characteristics of image densities to be recorded under control of the drive of the plurality of recording heads,
   wherein each of the plurality of data control units is configured to calculate a medium gap L2 between a preceding conveyed recording medium and a succeeding conveyed recording medium based on a detection result of the medium position detection unit,
   wherein an image is recorded on the recording medium such that the medium gap L2, and an interval L1 between the recording element row of a first recording head of the plurality of recording heads and the recording element row of a last recording head of the plurality of recording heads have a relationship L1>L2 or L1=L2, and
   wherein a recording head in which a recording region of the recording element row is opposite to the medium gap L2 is selected from the plurality of recording heads, and characteristics of image densities to be recorded are varied by a corresponding one of the plurality of driving characteristic control units while the recording region of the recording element row of the selected recording head is opposite to the medium gap L2.

2. The image forming apparatus according to claim 1, wherein each driving characteristic control unit comprises a voltage control section which changes a driving voltage of the corresponding recording head, and
   wherein the voltage control section changes a driving time for which a predetermined driving voltage is applied to the corresponding recording head to change the image density characteristic of the corresponding recording head.

3. The image forming apparatus according to claim 1, wherein each data control unit comprises:
   an image data storage section capable of storing image data for a plurality of pages;

a parameter storage section which stores various parameters in reading the image data for a page unit at a time when an image of the page unit is formed by the corresponding recording head;

a head driving synchronous signal generation circuit which generates a head driving synchronous signal based on the detection result from the medium position detection unit; and a data processing section which takes in predetermined image data in accordance with a predetermined parameter at a timing in accordance with the head driving synchronous signal to process the image; and wherein each data control unit is configured to change the density characteristic of the image to be recorded by the corresponding recording head when the gap L2 reaches the recording region of the corresponding recording head, and record the image with the changed density characteristic, when the succeeding recording medium reaches the recording region of the corresponding recording head.

4. The image forming apparatus according to claim 1, wherein each driving characteristic control unit comprises a voltage control section which generates a voltage control signal based on a corresponding temperature detection signal and outputs the voltage control signal to the corresponding recording head driving unit so as to apply a controlled driving voltage to the corresponding recording head from the corresponding recording head driving unit and to control the recording element row such that a desired image density is obtained, and wherein each voltage control section is configured to change the driving voltage output by the corresponding recording head driving unit while the recording region of the recording element row of the corresponding recording head is opposite to the medium gap L2 such that an image density of the formed image is appropriate.

5. An image forming apparatus comprising:

a plurality of recording heads having recording element rows arranged so as to extend in a direction crossing a conveying direction of a recording medium at right angles, wherein each recording element row is formed by a plurality of head units each of which has a nozzle row whose recording width is smaller than a width of the recording medium, and which are spaced apart from each other in at least two rows and arranged alternately with no gap disposed therebetween as seen from the conveying direction, and wherein the recording element rows are arranged at an interval along the conveying direction;

a plurality of data control units which respectively divide image data into partial image data for recording ranges by the nozzle rows of the plurality of head units, which respectively generate image data corresponding to the recording element rows, and which respectively set transfer timings of the image data, image formation timings, and parameters for driving the plurality of recording heads;

a plurality of recording head driving units which respectively drive the plurality of recording heads at the set formation timings;

a medium position detection unit which detects position information of the conveyed recording medium;

a plurality of thermistors which respectively detect temperatures of ink injection units of the plurality of recording heads;

a plurality of ink spout times calculation units which respectively count ink spout times for the plurality of recording heads;

a plurality of temperature detection units which respectively predict temperatures of ink for the plurality of recording heads based on temperature data detected by the plurality of thermistors and spout times data counted by the plurality of ink spout times calculation units; and a plurality of driving characteristic control units which respectively control characteristics of image densities to be recorded under control of the drive of the plurality of recording heads, wherein the plurality of data control units are configured to respectively calculate corresponding time intervals between a preceding conveyed recording medium and a succeeding conveyed recording medium based on a detection result of the medium position detection unit, and wherein for each of the plurality of recording heads, based on a prediction result of the corresponding temperature detection unit for recording on the succeeding conveyed recording medium, the characteristic of the image density is rewritable by the corresponding driving characteristic control unit within the corresponding calculated time interval, at a timing immediately after the corresponding image is formed on the preceding conveyed recording medium by the recording head in the conveying direction.

6. The image forming apparatus according to claim 5, wherein each data control unit comprises:

an image data storage section capable of storing image data for a plurality of pages;

a parameter storage section which stores various parameters in reading the image data for a page unit at a time when an image of the page unit is formed by the corresponding recording head;

a head driving synchronous signal generation circuit which generates a head driving synchronous signal based on the detection result from the medium position detection unit; and a data processing section which takes in predetermined image data in accordance with a predetermined parameter at a timing in accordance with the head driving synchronous signal to process the image; and wherein each data control unit is configured to:
(i) calculate a gap L2 between the preceding recording medium and the succeeding recording medium based on an output result from the medium position detection unit, (ii) record the image on the recording medium with a relationship between the gap L2 and an interval L1 between a recording element row of an initial recording head and a recording element row of a last recording head among the plurality of recording heads being L1>L2 or L1=L2, (iii) change the density characteristic of the image to be recorded by the corresponding recording head when the gap L2 reaches a recording region of the corresponding recording head, and (iv) record the image with the changed density characteristic, when the succeeding recording medium reaches the recording region of the corresponding recording head.

7. The image forming apparatus according to claim 5, wherein each driving characteristic control unit comprises a voltage control section which generates a voltage control signal based on the prediction result of the corresponding temperature detection unit and outputs the voltage control signal to a corresponding recording head driving unit so as to apply a controlled driving voltage to the corresponding recording head from the corresponding recording head driving unit and to control the recording element row such that a desired image density is obtained, and wherein each data control unit calculates a timing at which a gap L2 between the preceding recording medium and the succeeding recording medium faces the corresponding recording element row, and wherein each voltage control section is configured to change the driving voltage output by the corresponding recording head driving unit based on the calculated timing such that an image density of the formed image is appropriate.

* * * * *